(12) United States Patent
Kavallierou

(10) Patent No.: US 11,354,871 B2
(45) Date of Patent: Jun. 7, 2022

(54) HEAD-MOUNTABLE APPARATUS AND METHODS

(71) Applicant: Sony Interactive Entertainment Inc., Tokyo (JP)

(72) Inventor: Michael Adam Kavallierou, Burgess Hill (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/289,728

(22) Filed: Mar. 1, 2019

(65) Prior Publication Data

US 2019/0287313 A1    Sep. 19, 2019

(30) Foreign Application Priority Data

Mar. 14, 2018  (GB) ..................... 1804048

(51) Int. Cl.
  *G06T 19/20*   (2011.01)
  *G06F 3/04815* (2022.01)
  (Continued)

(52) U.S. Cl.
  CPC ............ *G06T 19/20* (2013.01); *A63F 13/211* (2014.09); *A63F 13/212* (2014.09);
  (Continued)

(58) Field of Classification Search
  CPC ......... G06T 19/20; G06T 13/40; A63F 13/25; A63F 13/65; A63F 2300/5553; B25J 13/08; G02B 27/017
  See application file for complete search history.

(56) References Cited

U.S. PATENT DOCUMENTS

2005/0060746 A1  3/2005  Kim
2008/0001951 A1* 1/2008  Marks ..................... A63F 13/79
                                                       345/474
(Continued)

FOREIGN PATENT DOCUMENTS

EP   2988275 A1   2/2016
GB   2548154 A    9/2017
(Continued)

OTHER PUBLICATIONS

Combined Search and Examination Report for corresponding Application No. GB1804048.5, 4 pages, dated Aug. 29, 2018.
(Continued)

*Primary Examiner* — Grace Q Li
(74) *Attorney, Agent, or Firm* — Matthew B. Dernier, Esq.

(57) ABSTRACT

An apparatus for configuring an avatar responsive to a content having at least one of a video and an audio signal includes an authoring unit configured to detect one or more events in a content comprising at least one of a video and an audio signal, categorise one or more of the detected events, and generate an event track for the content, the event track comprising one or more of the categorised events associated with a respective time; a selecting unit configured to select a configuration of an avatar to correspond to a respective categorised event of the event track; and an output generator configured to generate control data to configure an avatar in response to a selected configuration.

13 Claims, 12 Drawing Sheets

(51) Int. Cl.

| | | |
|---|---|---|
| G06T 13/40 | (2011.01) | |
| B25J 13/08 | (2006.01) | |
| G02B 27/01 | (2006.01) | |
| A63F 13/5255 | (2014.01) | |
| H04N 21/462 | (2011.01) | |
| A63F 13/25 | (2014.01) | |
| H04N 21/435 | (2011.01) | |
| H04N 21/478 | (2011.01) | |
| A63F 13/211 | (2014.01) | |
| H04N 21/8547 | (2011.01) | |
| A63F 13/213 | (2014.01) | |
| A63F 13/212 | (2014.01) | |
| A63F 13/65 | (2014.01) | |
| H04N 21/442 | (2011.01) | |
| H04N 13/344 | (2018.01) | |
| H04N 21/234 | (2011.01) | |
| H04N 21/466 | (2011.01) | |
| H04N 21/45 | (2011.01) | |
| H04N 21/439 | (2011.01) | |
| H04N 21/414 | (2011.01) | |
| H04N 21/44 | (2011.01) | |
| H04N 21/81 | (2011.01) | |
| H04N 21/84 | (2011.01) | |
| H04N 13/383 | (2018.01) | |
| H04N 13/279 | (2018.01) | |

(52) U.S. Cl.
CPC ............ *A63F 13/213* (2014.09); *A63F 13/25* (2014.09); *A63F 13/5255* (2014.09); *A63F 13/65* (2014.09); *B25J 13/08* (2013.01); *G02B 27/017* (2013.01); *G06F 3/04815* (2013.01); *G06T 13/40* (2013.01); *H04N 13/344* (2018.05); *H04N 21/23418* (2013.01); *H04N 21/41407* (2013.01); *H04N 21/435* (2013.01); *H04N 21/4394* (2013.01); *H04N 21/44008* (2013.01); *H04N 21/44218* (2013.01); *H04N 21/4532* (2013.01); *H04N 21/462* (2013.01); *H04N 21/466* (2013.01); *H04N 21/4781* (2013.01); *H04N 21/816* (2013.01); *H04N 21/84* (2013.01); *H04N 21/8547* (2013.01); *A63F 2300/5553* (2013.01); *H04N 13/279* (2018.05); *H04N 13/383* (2018.05)

(56) References Cited

U.S. PATENT DOCUMENTS

| | | | |
|---|---|---|---|
| 2009/0027182 A1 | 10/2009 | Zalewski | |
| 2010/0070858 A1 | 3/2010 | Morris | |
| 2010/0083320 A1 | 4/2010 | Roberts | |
| 2011/0296324 A1* | 12/2011 | Goossens | ............ G06F 3/04883 |
| | | | 715/763 |
| 2012/0054281 A1* | 3/2012 | Westmoreland | ....... G06Q 10/10 |
| | | | 709/205 |
| 2015/0075303 A1* | 3/2015 | Connor | ................... G06F 3/011 |
| | | | 73/865.4 |
| 2016/0129350 A1 | 5/2016 | Khalsa | |
| 2017/0047096 A1* | 2/2017 | Li | ...................... G06K 9/00302 |
| 2017/0090554 A1 | 3/2017 | Pececnik | |
| 2018/0018894 A1 | 1/2018 | Coulson, Sr. | |
| 2018/0158093 A1* | 6/2018 | Szirtes | ............... G06Q 30/0269 |
| 2018/0165863 A1* | 6/2018 | Kubo | ..................... A63F 13/79 |

FOREIGN PATENT DOCUMENTS

| WO | 2007130691 A2 | 11/2007 |
|---|---|---|
| WO | 2012166072 A1 | 12/2012 |

OTHER PUBLICATIONS

Extended European Search Report for corresponding Application No. EP 19157241.1, 7 pages, dated Jul. 18, 2019.

Guy Hoffman et al: "Robotic experience companionship in music listening and video watching" Personal and Ubiquitous Computing. Springer Verlag. London. GB. vo 1 • 20. No. 1, pp. 51-63, Feb. 1, 2016.

Sorell Tom et al: "Robot carers, ethics, and older people" Ethics and Information Technology. Sprinkerlink.com, vol. 16. No. 3, pp. 183-195, Mar. 25, 2014.

\* cited by examiner

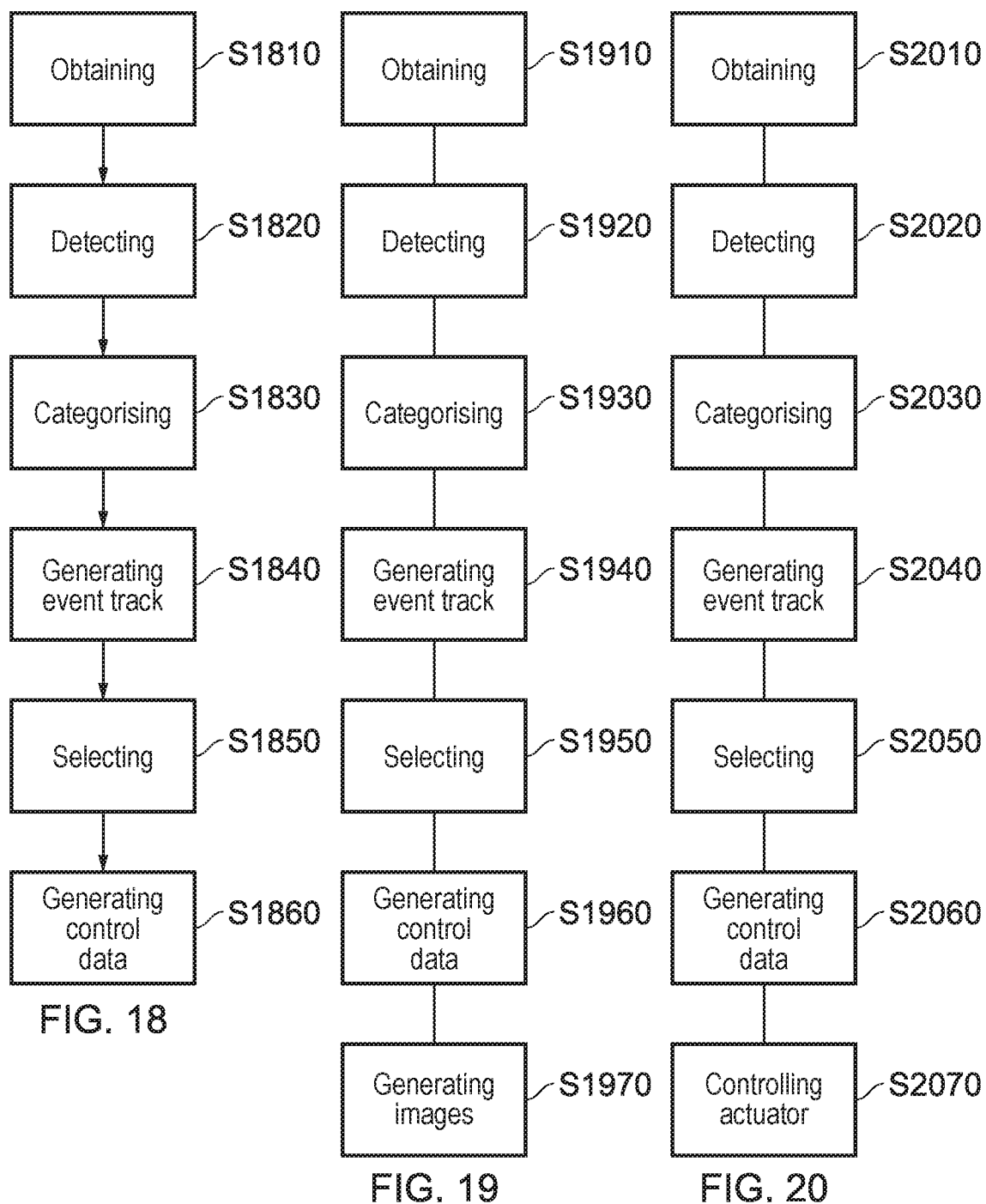

HEAD-MOUNTABLE APPARATUS AND METHODS

BACKGROUND

Field of the Disclosure

This disclosure relates to virtual reality apparatus and methods.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

A head-mountable display (HMD) is one example of a head-mountable apparatus for use in a virtual reality system in which an HMD wearer views a virtual environment. In an HMD, an image or video display device is provided which may be worn on the head or as part of a helmet. Either one eye or both eyes are provided with small electronic display devices.

Although the original development of HMDs and virtual reality was perhaps driven by the military and professional applications of these devices, HMDs are becoming more popular for use by casual users in, for example, computer game or domestic computing applications.

The techniques to be discussed are applicable to individual three-dimensional images or to video signals comprising successive three-dimensional images. Therefore, references to "images" in the discussion below should be taken to encompass the use of the same techniques in respect of video signals.

The foregoing paragraphs have been provided by way of general introduction, and are not intended to limit the scope of the following claims. The described embodiments, together with further advantages, will be best understood by reference to the following detailed description taken in conjunction with the accompanying drawings.

SUMMARY

An example embodiment provides an apparatus for configuring an avatar responsive to a content comprising video and audio signals, comprising:
an authoring unit configured to detect one or more events in a content comprising video and audio signals, categories one or more of the detected events, and generate an event track for the content, the event track comprising one or more of the categorised events associated with a respective time;
a selecting unit configured to select a configuration of an avatar to correspond to a respective categorised event of the event track;
an output generator configured to generate control data to configure an avatar in response to a selected configuration.

Another example embodiment provides a method of configuring an avatar responsive to a content comprising video and audio signals, comprising:
obtaining a content comprising video and audio signals;
detecting one or more events in the content;
categorising one or more of the detected events;
generating an event track for the content, the event track comprising one or more of the categorised events associated with a respective time;
selecting a configuration of an avatar to correspond to a respective categorised event of the event track;
generating control data to configure an avatar in response to a selected configuration.

Another example embodiment provides computer software which, when executed by a computer, causes the computer to perform the steps of the method defined above.

Example embodiments provide a machine-readable, non-transitory storage medium which stores such computer software.

Various other aspects and features of the present disclosure are defined in the appended claims and within the text of the accompanying description and include at least a head mountable apparatus such as a display and a method of operating a head-mountable apparatus as well as a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 18 is a schematic flowchart illustrating a method of configuring an avatar responsive to a content comprising at least one of a video and an audio signal;

FIG. 19 is a schematic flowchart illustrating a method of configuring an avatar responsive to a content comprising at least one of a video and an audio signal and generating images including the virtual avatar;

FIG. 20 is a schematic flowchart illustrating a method of configuring an avatar responsive to a content comprising at least one of a video and an audio signal and controlling an actuator of a robot.

DESCRIPTION OF THE EMBODIMENTS

Figure 1:
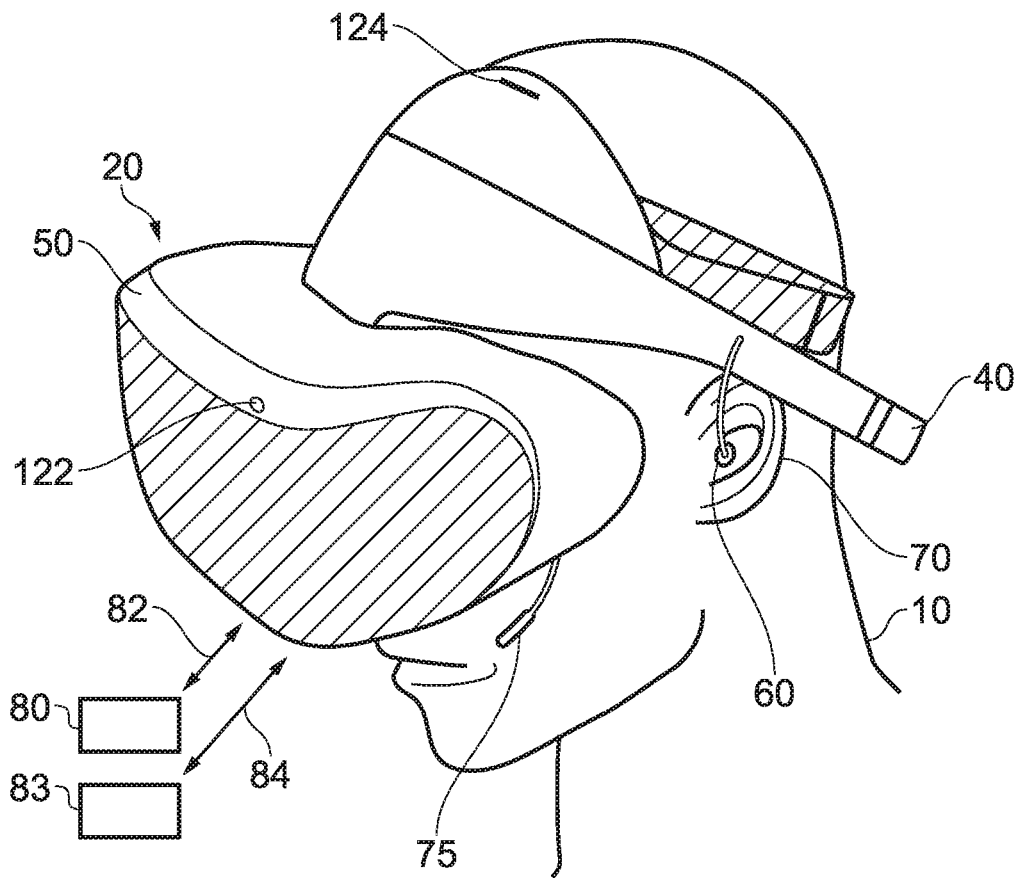
FIG. 1 schematically illustrates an HMD worn by a user.

Referring now to the drawings, wherein like reference numerals designate identical or corresponding parts throughout the several views, in FIG. 1 a user 10 is wearing an HMD 20 (as an example of a generic head-mountable apparatus or virtual reality apparatus). The HMD comprises a frame 40, in this example formed of a rear strap and a top strap, and a display portion 50.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD.

The HMD has associated headphone audio transducers or earpieces 60 which fit into the user's left and right ears 70. The earpieces 60 replay an audio signal provided from an external source, which may be the same as the video signal source which provides the video signal for display to the user's eyes. A boom microphone 75 is mounted on the HMD so as to extend towards the user's mouth.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 122 may capture images to the front of the HMD, in use. A Bluetooth® antenna 124 may provide communication facilities or may simply be arranged as a directional antenna to allow a detection of the direction of a nearby Bluetooth transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection 82. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply 83 (including one or more batteries and/or being connectable to a mains power outlet) may be linked by a cable 84 to the HMD. Note that the power supply 83 and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the disclosure are applicable to an HMD having at least one electrical and/or optical cable linking the HMD to another device, such as a power supply and/or a video (and/or audio) signal source. So, embodiments of the disclosure can include, for example:

(a) an HMD having its own power supply (as part of the HMD arrangement) but a cabled connection to a video and/or audio signal source;

(b) an HMD having a cabled connection to a power supply and to a video and/or audio signal source, embodied as a single physical cable or more than one physical cable;

(c) an HMD having its own video and/or audio signal source (as part of the HMD arrangement) and a cabled connection to a power supply;

(d) an HMD having a wireless connection to a video and/or audio signal source and a cabled connection to a power supply; or (e) an HMD having its own video and/or audio signal source and its own power supply (both as part of the HMD arrangement).

If one or more cables are used, the physical position at which the cable 82 and/or 84 enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables 82, 84 relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment. An example of such an arrangement will be described below with reference to FIG. 4.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
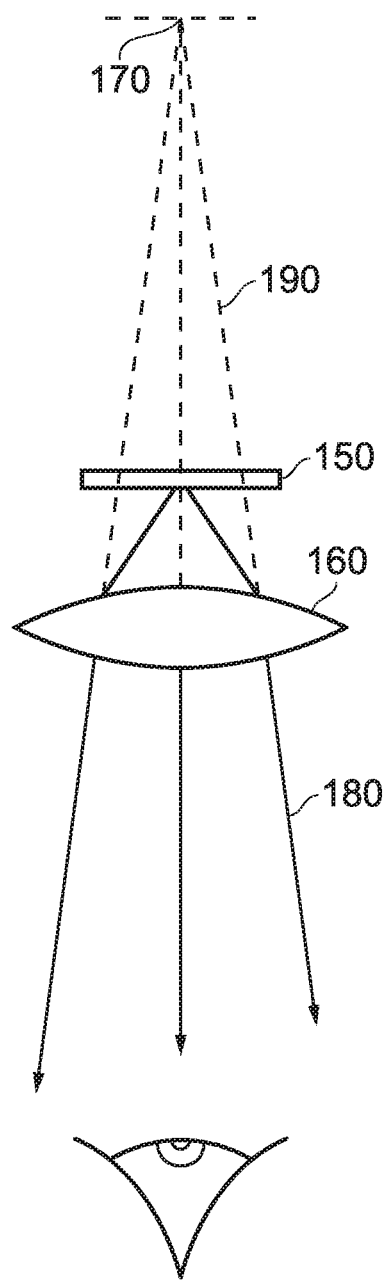
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
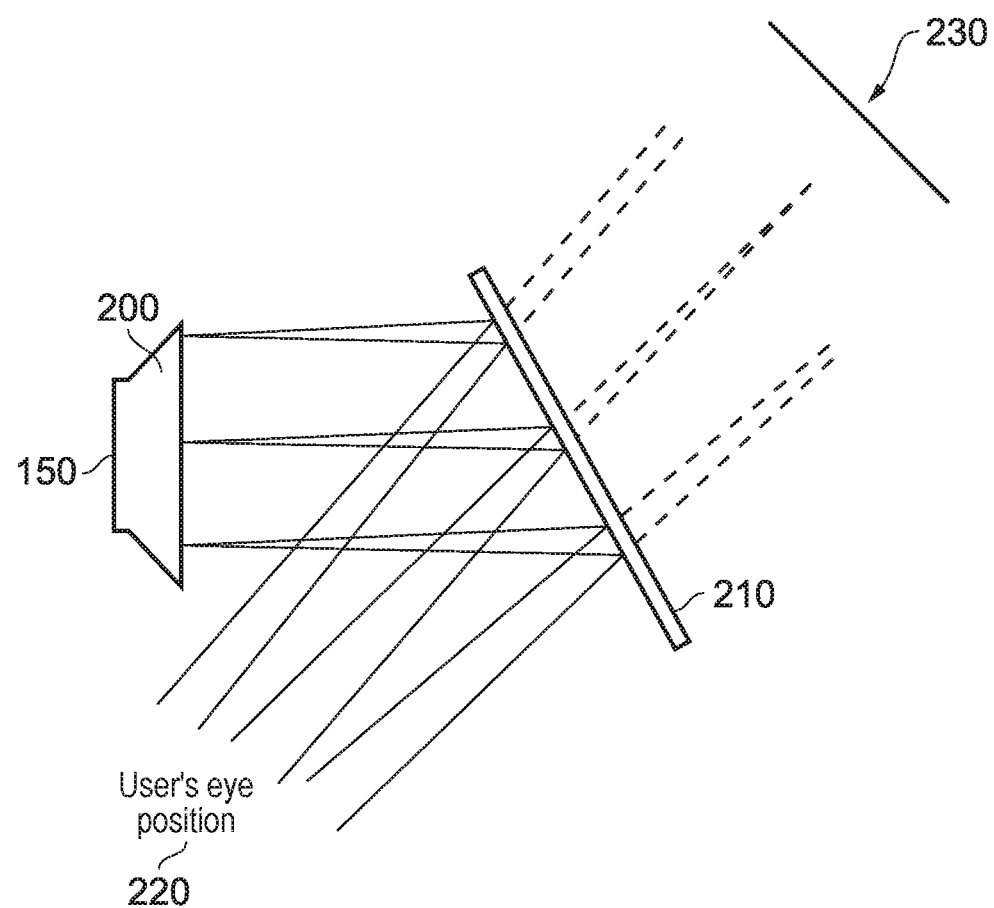
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

Figure 6:
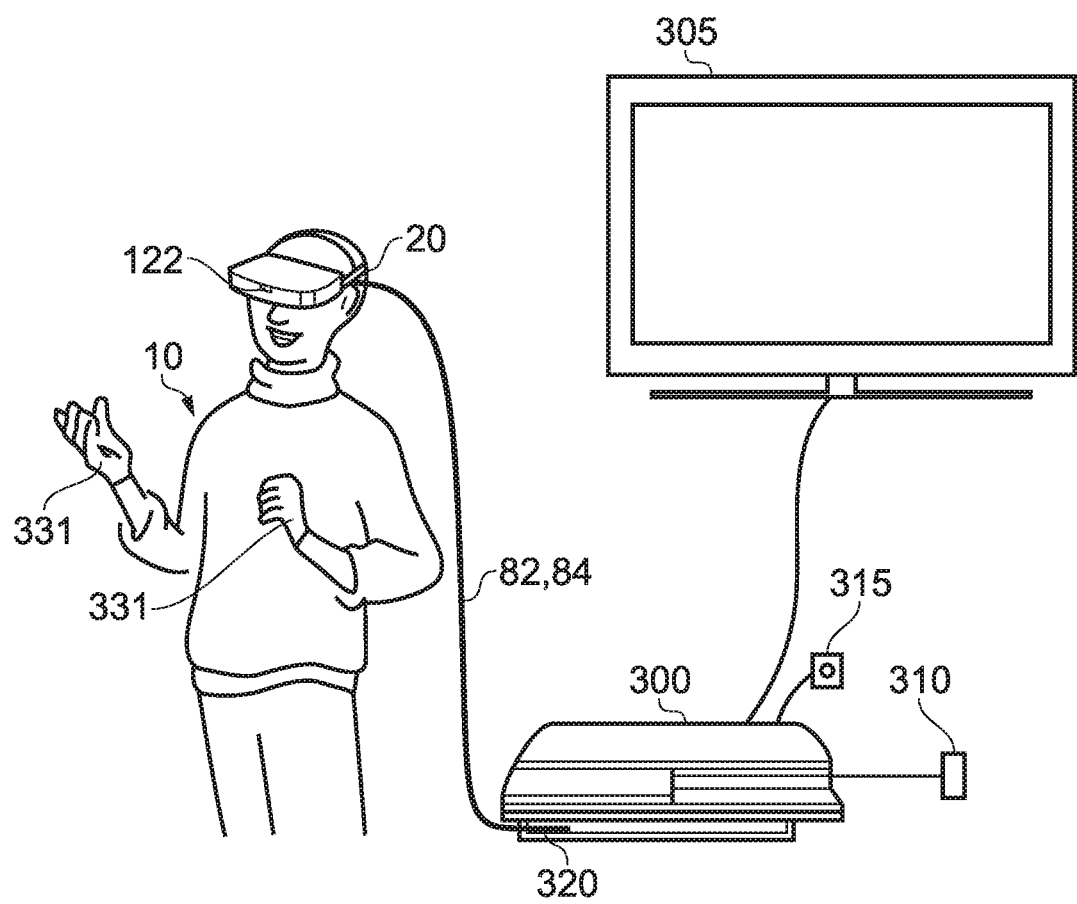
FIGS. 6 and 7 schematically illustrate a user wearing an HMD connected to a Sony® PlayStation 3® games console.

FIG. 6 schematically illustrates an example virtual reality system and in particular shows a user wearing an HMD connected to a Sony® PlayStation 3® games console 300 as an example of a base device. The games console 300 is connected to a mains power supply 310 and (optionally) to a main display screen (not shown). A cable, acting as the cables 82, 84 discussed above (and so acting as both power supply and signal cables), links the HMD 20 to the games console 300 and is, for example, plugged into a USB socket 320 on the console 300. Note that in the present embodiments, a single physical cable is provided which fulfils the functions of the cables 82, 84.

The video displays in the HMD 20 are arranged to display images generated by the games console 300, and the earpieces 60 in the HMD 20 are arranged to reproduce audio signals generated by the games console 300. Note that if a USB type cable is used, these signals will be in digital form when they reach the HMD 20, such that the HMD 20 comprises a digital to analogue converter (DAC) to convert at least the audio signals back into an analogue form for reproduction.

Images from the camera 122 mounted on the HMD 20 are passed back to the games console 300 via the cable 82, 84. Similarly, if motion or other sensors are provided at the HMD 20, signals from those sensors may be at least partially processed at the HMD 20 and/or may be at least partially processed at the games console 300. The use and processing of such signals will be described further below.

The USB connection from the games console 300 also provides power to the HMD 20, according to the USB standard.

FIG. 6 also shows a separate display 305 such as a television or other openly viewable display (by which it is meant that viewers other than the HMD wearer may see images displayed by the display 305) and a camera 315, which may be (for example) directed towards the user (such as the HMD wearer) during operation of the apparatus. An example of a suitable camera is the PlayStation Eye camera, although more generally a generic "webcam", connected to the console 300 by a wired (such as a USB) or wireless (such as WiFi or Bluetooth) connection.

The display 305 may be arranged (under the control of the games console) to provide the function of a so-called "social screen". It is noted that playing a computer game using an HMD can be very engaging for the wearer of the HMD but less so for other people in the vicinity (particularly if they are not themselves also wearing HMDs). To provide an improved experience for a group of users, where the number of HMDs in operation is fewer than the number of users, images can be displayed on a social screen. The images displayed on the social screen may be substantially similar to those displayed to the user wearing the HMD, so that viewers of the social screen see the virtual environment (or a subset, version or representation of it) as seen by the HMD wearer. In other examples, the social screen could display other material such as information relating to the HMD wearer's current progress through the ongoing computer game. For example, the HMD wearer could see the game environment from a first person viewpoint whereas the social screen could provide a third person view of activities and movement of the HMD wearer's avatar, or an overview of a larger portion of the virtual environment. In these examples, an image generator (for example, a part of the functionality of the games console) is configured to generate some of the virtual environment images for display by a display separate to the head mountable display.

In FIG. 6 the user is wearing one or two so-called haptic gloves 331. These can include actuators to provide haptic feedback to the user, for example under the control of processing carried out by the console 300. They may also provide configuration and/or location sensing.

Note that other haptic interfaces can be used, providing one or more actuators and/or one or more sensors. For example, a so-called haptics suit may be worn by the user. Haptic shoes may include one or more actuators and one or more sensors. Or the user could stand on or hold a haptic interface device. The one or more actuators associated with these devices may have different respective frequency responses and available amplitudes of vibration. Therefore in example arrangements to be discussed below the haptic generator can be responsive to attributes defining one or capabilities of the haptic interface. In some examples, an attribute defines a frequency response of the haptic interface. In some examples, an attribute defines a maximum amplitude which may be represented by the haptic interface.

Figure 7:
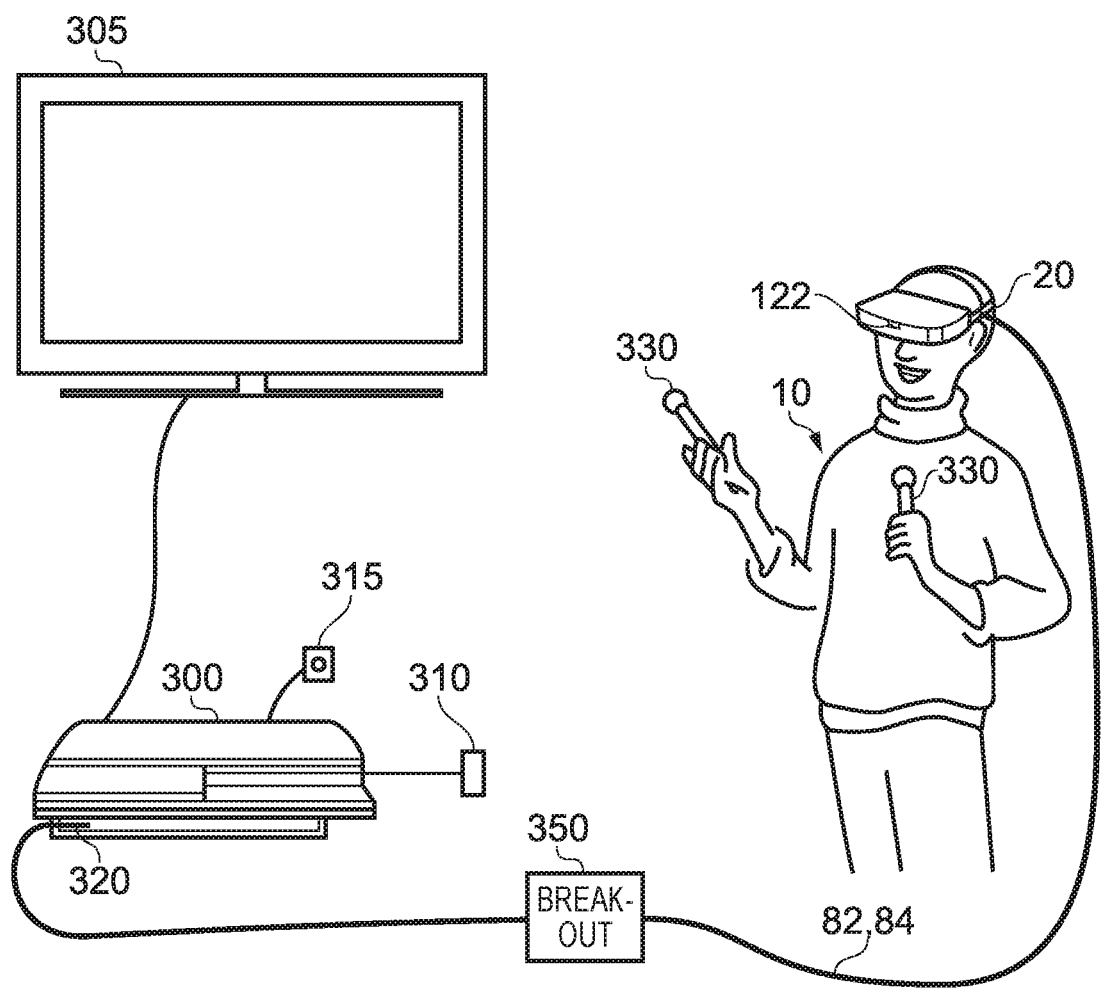

FIG. 7 schematically illustrates a similar arrangement (another example of a virtual reality system) in which the games console is connected (by a wired or wireless link) to a so-called "break out box" acting as a base or intermediate device 350, to which the HMD 20 is connected by a cabled link 82, 84. The breakout box has various functions in this regard. One function is to provide a location, near to the user, for some user controls relating to the operation of the HMD, such as (for example) one or more of a power control, a brightness control, an input source selector, a volume control and the like. Another function is to provide a local power supply for the HMD (if one is needed according to the embodiment being discussed). Another function is to provide a local cable anchoring point. In this last function, it is not envisaged that the break-out box 350 is fixed to the ground or to a piece of furniture, but rather than having a very long trailing cable from the games console 300, the break-out box provides a locally weighted point so that the cable 82, 84 linking the HMD 20 to the break-out box will tend to move around the position of the break-out box. This can improve user safety and comfort by avoiding the use of very long trailing cables.

In FIG. 7, the user is also shown holding a pair of hand-held controller 330 which may be, for example, Sony® Move® controllers which communicate wirelessly with the games console 300 to control (or to contribute to the control of) game operations relating to a currently executed game program. The user may also be wearing one or two haptic gloves as discussed in connection with FIG. 6.

It will be appreciated that the localisation of processing in the various techniques described in this application can be varied without changing the overall effect, given that an HMD may form part of a set or cohort of interconnected devices (that is to say, interconnected for the purposes of data or signal transfer, but not necessarily connected by a physical cable). So, processing which is described as taking place "at" one device, such as at the HMD, could be devolved to another device such as the games console (base device) or the break-out box. Processing tasks can be shared amongst devices. Source signals, on which the processing is to take place, could be distributed to another device, or the processing results from the processing of those source signals could be sent to another device, as required. So any references to processing taking place at a particular device should be understood in this context. Similarly, where an interaction between two devices is basically symmetrical, for example where a camera or sensor on one device detects a signal or feature of the other device, it will be understood that unless the context prohibits this, the two devices could be interchanged without any loss of functionality.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion.

Figure 8:
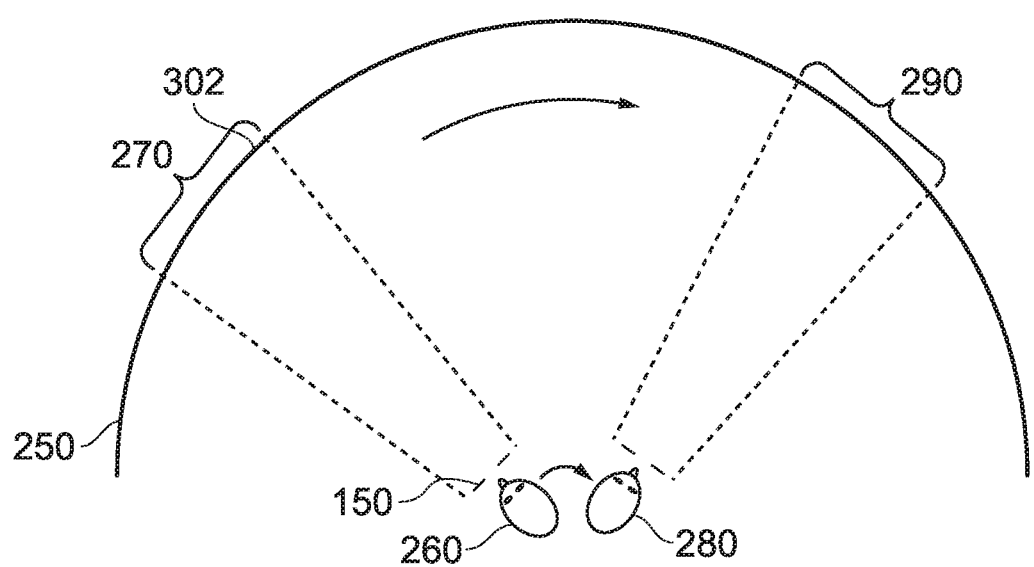
FIG. 8 schematically illustrates a change of view of user of an HMD.

FIG. 8 schematically illustrates the effect of a user head movement in a VR or AR system.

Referring to FIG. 8, a virtual environment is represented by a (virtual) spherical shell 250 around a user. This provides an example of a virtual display screen (VDS). Because of the need to represent this arrangement on a two-dimensional paper drawing, the shell is represented by a part of a circle, at a distance from the user equivalent to the separation of the displayed virtual image from the user. A user is initially at a first position 260 and is directed towards a portion 270 of the virtual environment. It is this portion 270 which is represented in the images displayed on the display elements 150 of the user's HMD. It can be seen from the drawing that the VDS subsists in three dimensional space (in a virtual sense) around the position in space of the HMD wearer, such that the HMD wearer sees a current portion of the VDS according to the HMD orientation.

Consider the situation in which the user then moves his head to a new position and/or orientation 280. In order to maintain the correct sense of the virtual reality or augmented reality display, the displayed portion of the virtual environment also moves so that, at the end of the movement, a new portion 290 is displayed by the HMD.

So, in this arrangement, the apparent viewpoint within the virtual environment moves with the head movement. If the head rotates to the right side, for example, as shown in FIG. 8, the apparent viewpoint also moves to the right from the user's point of view. If the situation is considered from the aspect of a displayed object, such as a displayed object 300, this will effectively move in the opposite direction to the head movement. So, if the head movement is to the right, the apparent viewpoint moves to the right but an object such as the displayed object 300 which is stationary in the virtual environment will move towards the left of the displayed image and eventually will disappear off the left-hand side of the displayed image, for the simple reason that the displayed portion of the virtual environment has moved to the right whereas the displayed object 300 has not moved in the virtual environment.

Figure 2:
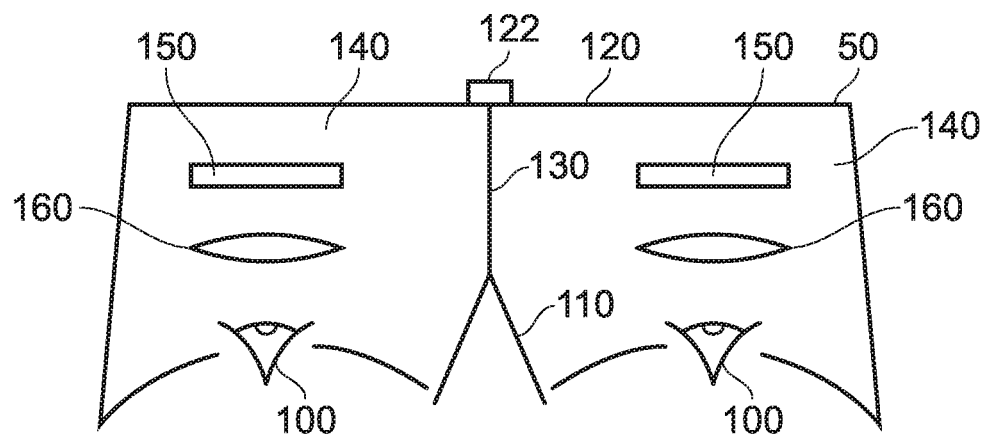
FIG. 2 is a schematic plan view of an HMD.
Figure 9A:
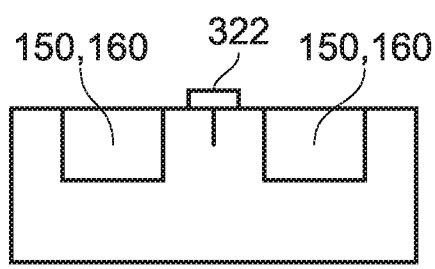
FIGS. 9a and 9b schematically illustrate HMDs with motion sensing.
Figure 9B:
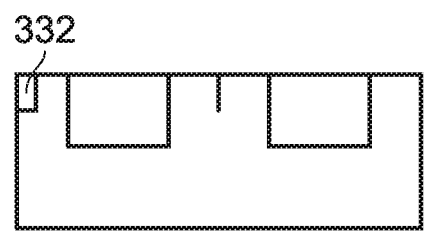

FIGS. 9a and 9b schematically illustrated HMDs with motion sensing. The two drawings are in a similar format to that shown in FIG. 2. That is to say, the drawings are schematic plan views of an HMD, in which the display element 150 and optical elements 160 are represented by a simple box shape. Many features of FIG. 2 are not shown, for clarity of the diagrams. Both drawings show examples of HMDs with a motion detector for detecting motion of the observer's head.

In FIG. 9a, a forward-facing camera 322 is provided on the front of the HMD. This may be the same camera as the camera 122 discussed above, or may be an additional camera. This does not necessarily provide images for display to the user (although it could do so in an augmented reality arrangement). Instead, its primary purpose in the present embodiments is to allow motion sensing. A technique for using images captured by the camera 322 for motion sensing will be described below in connection with FIG. 10. In these arrangements, the motion detector comprises a camera mounted so as to move with the frame; and an image comparator operable to compare successive images captured by the camera so as to detect inter-image motion.

FIG. 9b makes use of a hardware motion detector 332. This can be mounted anywhere within or on the HMD. Examples of suitable hardware motion detectors are piezoelectric accelerometers or optical fibre gyroscopes. It will of course be appreciated that both hardware motion detection and camera-based motion detection can be used in the same device, in which case one sensing arrangement could be used as a backup when the other one is unavailable, or one sensing arrangement (such as the camera) could provide data for changing the apparent viewpoint of the displayed images, whereas the other (such as an accelerometer) could provide data for image stabilisation.

Figure 10:
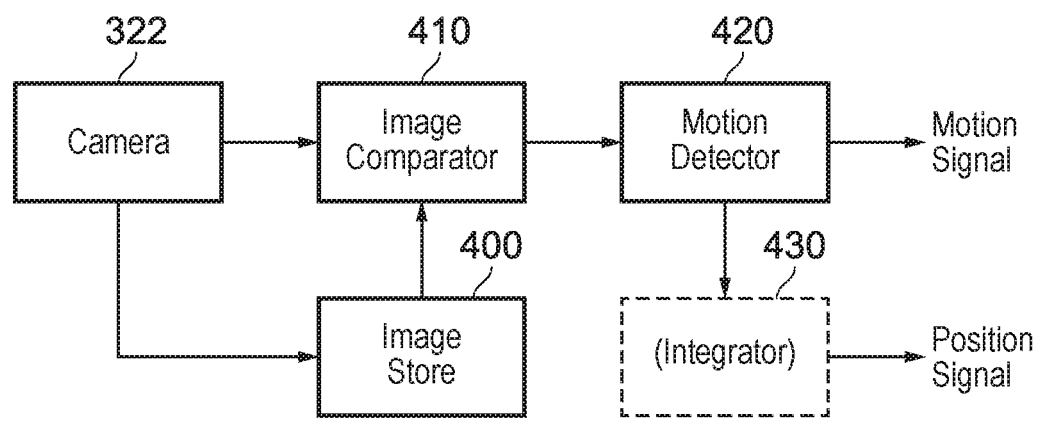
FIG. 10 schematically illustrates a position sensor based on optical flow detection.

FIG. 10 schematically illustrates one example of motion detection using the camera 322 of FIG. 9a.

The camera 322 is a video camera, capturing images at an image capture rate of, for example, 25 images per second. As each image is captured, it is passed to an image store 400 for storage and is also compared, by an image comparator 410, with a preceding image retrieved from the image store. The comparison uses known block matching techniques (so-called "optical flow" detection) to establish whether substantially the whole image has moved since the time at which the preceding image was captured. Localised motion might indicate moving objects within the field of view of the camera 322, but global motion of substantially the whole image would tend to indicate motion of the camera rather than of individual features in the captured scene, and in the present case because the camera is mounted on the HMD, motion of the camera corresponds to motion of the HMD and in turn to motion of the user's head.

The displacement between one image and the next, as detected by the image comparator 410, is converted to a signal indicative of motion by a motion detector 420. If required, the motion signal is converted by to a position signal by an integrator 430.

As mentioned above, as an alternative to, or in addition to, the detection of motion by detecting inter-image motion between images captured by a video camera associated with the HMD, the HMD can detect head motion using a mechanical or solid state detector 332 such as an accelerometer. This can in fact give a faster response in respect of the indication of motion, given that the response time of the video-based system is at best the reciprocal of the image capture rate. In some instances, therefore, the detector 332 can be better suited for use with higher frequency motion detection. However, in other instances, for example if a high image rate camera is used (such as a 200 Hz capture rate camera), a camera-based system may be more appropriate. In terms of FIG. 10, the detector 332 could take the place of the camera 322, the image store 400 and the comparator 410, so as to provide an input directly to the motion detector 420. Or the detector 332 could take the place of the motion detector 420 as well, directly providing an output signal indicative of physical motion.

Other position or motion detecting techniques are of course possible. For example, a mechanical arrangement by which the HMD is linked by a moveable pantograph arm to a fixed point (for example, on a data processing device or on a piece of furniture) may be used, with position and orientation sensors detecting changes in the deflection of the pantograph arm. In other embodiments, a system of one or more transmitters and receivers, mounted on the HMD and on a fixed point, can be used to allow detection of the position and orientation of the HMD by triangulation techniques. For example, the HMD could carry one or more directional transmitters, and an array of receivers associated with known or fixed points could detect the relative signals from the one or more transmitters. Or the transmitters could be fixed and the receivers could be on the HMD. Examples of transmitters and receivers include infra-red transducers, ultrasonic transducers and radio frequency transducers. The radio frequency transducers could have a dual purpose, in that they could also form part of a radio frequency data link to and/or from the HMD, such as a Bluetooth® link.

Figure 11:
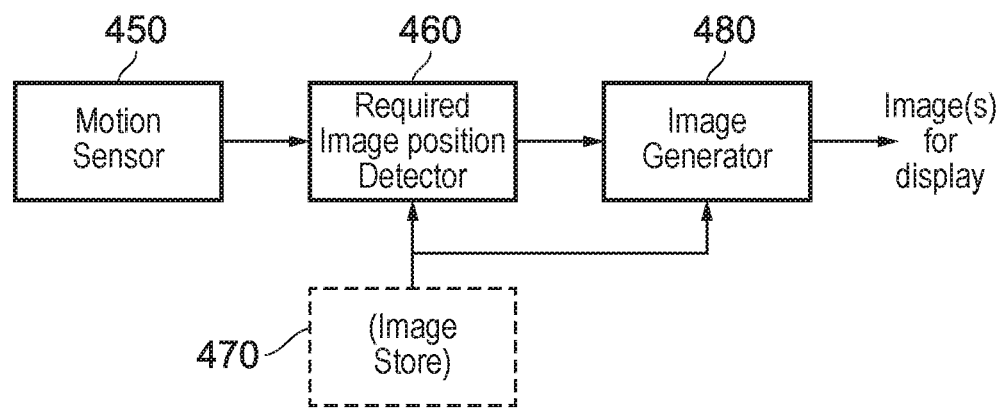
FIG. 11 schematically illustrates image processing carried out in response to a detected position or change in position of an HMD.

FIG. 11 schematically illustrates image processing carried out in response to a detected position or change in position of the HMD.

As mentioned above in connection with FIG. 10, in some applications such as virtual reality and augmented reality arrangements, the apparent viewpoint of the video being displayed to the user of the HMD is changed in response to a change in actual position or orientation of the user's head.

With reference to FIG. 11, this is achieved by a motion sensor 450 (such as the arrangement of FIG. 10 and/or the motion detector 332 of FIG. 9b) supplying data indicative of motion and/or current position to a required image position detector 460, which translates the actual position of the HMD into data defining the required image for display. An image generator 480 accesses image data stored in an image store 470 if required, and generates the required images from the appropriate viewpoint for display by the HMD. The external video signal source can provide the functionality of the image generator 480 and act as a controller to compensate for the lower frequency component of motion of the observer's head by changing the viewpoint of the displayed image so as to move the displayed image in the opposite direction to that of the detected motion so as to change the apparent viewpoint of the observer in the direction of the detected motion.

The operations to be discussed below relate to an apparatus and method for configuring an avatar responsive to a content comprising at least one of a video and an audio signal. Virtual reality applications may often include an avatar representation of a user within a virtual environment in addition to predefined computer generated avatars that supplement the user's experience when viewing the virtual environment. However, some virtual reality applications may present audio visual content to the user for viewing movies or other similar content, for which no avatar is included within the virtual environment. This may mean that the user feels a sense of solitude or isolation when viewing such content and the user may thus be deterred from viewing the content.

Means and techniques to enhance a user's experience when viewing virtual environments where the user may feel a sense of isolation are therefore advantageous.

The present invention seeks to enhance a user's experience when presented with audio/visual content.

Figure 12:
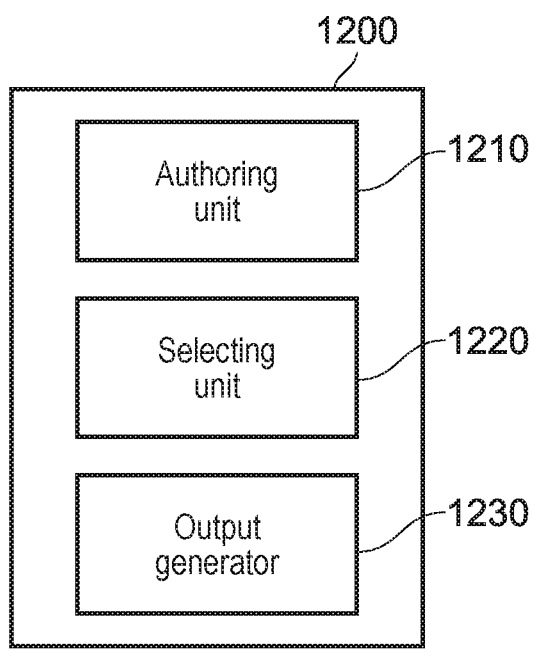
FIG. 12 schematically illustrates a functional block diagram of an apparatus for configuring an avatar responsive to a content.

FIG. 12 illustrates a functional block diagram of an apparatus 1200 for configuring an avatar responsive to a content comprising at least one of a video and an audio signal. In embodiments of the disclosure the apparatus 1200 for configuring an avatar responsive to the content comprises an authoring unit 1210, a selecting unit 1220 and an output generator 1230. The apparatus 1200 may be provided as part of the HMD 20, as part of the game console 300 or provided separate to the HMD 20 and the games console 300. The apparatus 1200 may communicate with respective devices (such as the HMD 20, games console 300) as appropriate via an audio/visual input port, an Ethernet® port, a Bluetooth® wireless link, a Wi-Fi® wireless link, or one or more universal serial bus (USB) ports (not shown in FIG. 12). In some examples audio and video signals may be output via an AV output, such as an HDMI port. As such, the apparatus 1200 can be configured to receive content comprising audio and video signals, and can transmit data via a wired or wireless communication such as one using the Bluetooth® link or the Wi-Fi® wireless link.

In embodiments of the disclosure the authoring unit 1210 can be configured to detect one or more events in the content comprising at least one of a video and an audio signal, categorise one or more of the detected events, and generate an event track for the content, the event track comprising one or more of the categorised events associated with a respective time, e.g. the time at which the event takes place within the content. The content can be received by the apparatus 1200 and the authoring unit 1210 can detect one or more events for the content based on the properties of the video signal and/or the audio signal. For example, events may be detected by performing an analysis of the properties of at least one of the audio signal and the video signal so as to identify one or more events for the content. In some examples, the content may be a television programme or a movie or similar recorded content, and events may be detected based on sounds (such as laughter, screaming, explosions, rain) or certain features in an image (such as rain, sun, snow, fire, and/or results of object recognition, facial recognition, and/or expression recognition) or a combination thereof. In this way, the authoring unit 1210 can detect one or more events for the content, which may be of significance for a user when viewing and/or listening to the content. As such, events that may be of importance to the user's experience can be detected by the authoring unit 1210.

One or more events can be detected for the content and one or more of the detected events can be categorised by the authoring unit 1210. The authoring unit 1210 can be configured to generate, for the content, an event track comprising one or more of the categorised events, where each categorised event is assigned a respective time and the event track can be populated with one or more of the categorised events according to their respective times. By using one or more of the categorised events, the authoring unit 1210 can generate the event track for the content. This means that the content has an associated event track comprising one or more categorised events, where each categorised event of the event track has a respective time. In other words, the authoring unit 1210 can generate the event track by selecting some or all of the categorised events for the content and populating the event track with the respective categorised events such that each categorised event has a respective time within the event track.

In embodiments of the disclosure the authoring unit 1210 can be configured to categorise a detected event according to at least one of an audio classification and an image classification, and apply an event marker to the event track with a timestamp derived according to the content. For example, the authoring unit 1210 may detect an event according to one or more properties of an audio signal and perform a categorisation of the detected event according to an audio classification, wherein the audio classification comprises a plurality of respective audio classes. In some examples, the audio classification may comprise a first audio class, and a second audio class, where the first audio class corresponds to amusement and the second audio class corresponds to fear. It will be appreciated that other respective classes of the audio classification may similarly be considered so as to classify a detected event according to a wide range of characteristics. Alternatively or in addition, the authoring unit 1210 may detect an event according to one or more properties of a video signal and perform a categorisation of the detected event according to an image classification, wherein the audio classification comprises a plurality of respective image classes. The image classification may comprise a first image class, and a second image class, where the first image class corresponds to amusement and the second image class corresponds to fear, for example, (other characteristics may similarly be considered). Alternatively or in addition, the authoring unit 1210 may detect an event based on properties of both the video signal and the audio signal and the detected event may be categorised according to both an audio classification and an image classification.

Hence the authoring unit 1210 can be configured to categorise a detected event according to at least one of an audio classification and an image classification, and an event marker can be applied to the event track for a categorised event, such that an event marker has an associated categorisation and a timestamp that determines the event marker's positioning within the event track. Each event marker can be applied to the event track generated for the video content where an event marker has a timestamp derived according to the video content. This means that respective markers can be appropriately positioned relative to each other in the event track and the one or more categorised events are marked in the event track with a respective time.

In embodiments of the disclosure, the authoring unit 1210 can be configured to perform real-time event detection and categorisation for the content, for example whilst broadcast or streamed content is being received. One or more events can be detected and categorised for the content whilst the content is being presented to the user. In this way the authoring unit 1210 can generate the event track for the content in real-time, and as such in embodiments of the disclosure an event track can be generated for content such as a television programme, or a movie or similar recorded content whilst the content is presented to the user. In the case of recorded content, the authoring unit 1210 can be configured to detect one or more events and categorise detected events so as to generate an event track for the content in advance of the content being presented to the user (offline event track generation for content). As such, an event track may be suitably stored in a memory of the apparatus 1200 or data indicative of the event track may be communicated to respective devices to be stored. When the user selects the content, the event track associated with the content may be used without the need to generate the event track in real-time.

Alternatively or in addition, when the user selects a programme to be viewed from an electronic programme guide (EPG), the apparatus 1200 may obtain data associated with the content from a server in data communication with the apparatus 1200. The data associated with the content selected from the EPG may be used by the apparatus 1200 to generate the event track for the content. Alternatively or in addition, EPG data or supplementary data (such as Amazon Prime® so-called 'x-ray' data) associated with the selected content may identify the genre of the content and/or provide one or more event indicators indicating the characteristic properties of one or more respective events in the content. For example, the user may select a comedy programme from an EPG, and data associated with the selected programme may be received by the apparatus. The data may indicate the categorisations of the respective events in the content and their respective times such that an event track can be generated from the data associated with the content. Alternatively or in addition, the data may include one or more event indicators which indicate one or more properties characteristic of commonly occurring events in the content such as canned laughter, so that the event indicator can be used by the apparatus in real-time to detect events corresponding to canned laughter. Other examples of information that may be included in a supplementary data stream are the current scene location, or identities of the characters and/or actors on-screen. Alternatively or in addition, subtitle data or closed-caption data may be accessed, comprising a transcript of the dialogue and optionally basic scene information such as the presence of canned laughter, enabling a comparatively simple analysis of keywords indicating happiness, anger, audience response and the like.

In this way, the apparatus 1200 may receive updated event indicators from the broadcaster and/or server which can be used to detect events in the content.

Hence more generally it will be appreciated that an event track may be generated off-line, before the content is played back and before an avatar is configured to respond to the event track. This may be done at the user's receiver, or may be done by a broadcaster, who then embeds the event track within a subsequent broadcast or stream for use by a user's receiver. Alternatively or in addition an event track may be generated in real-time, for example by a user's client device as the user receives and watches broadcast or streamed content, or for inclusion by a broadcaster or streamer as the content is transmitted; in either case the event track may be retained for subsequent re-use, or may be discarded as soon as it is used, thereby becoming an instantaneous event track used as a temporary representation of current events. It will be appreciated that when used temporarily, or when embedded in a broadcast or stream, a time stamp explicitly associating event track information with the corresponding content may not be necessary as the content is already coincident with the event track information.

Hence more generally the event track, comprising one or more of the categorised events associated with a respective time, may take the form of a data set comprising categorised events associated with time stamps, or may take the form of an event categorisation for immediate use in real-time, with the associated respective time being the same time or a fixed offset (e.g. a frame delay) and hence not explicitly associated as data with the event categorisation. Similarly where broadcast or streamed with the content, the categorised events may be embedded within the appropriate frame, group-of-pictures or other suitable metadata and hence be associated with a respective time by virtue of their position within the broadcast or stream.

In embodiments of the disclosure the selecting unit 1220 can be configured to select a configuration of an avatar to correspond to a respective categorised event of the event track. The one or more categorised events of the event track each have a categorisation, and the selecting unit 1220 can appropriately select a configuration for the avatar from a plurality of possible configurations so that the selected configuration corresponds to an event of the event track. This means that the selecting unit 1220 can be configured to select an avatar configuration in accordance with the event track. For example, an avatar configuration model may define a plurality of avatar configurations and the selecting unit may select a configuration of the avatar from the plurality of avatar configurations so that a selected configuration may correspond to a respective categorised event of the event track.

The event track comprises one or more categorised events respectively marked in the event track with a respective time derived according to the time at which the event occurs with respect to the content. For example, the event track may comprise a first categorised event at t1 and a second categorised event at t2, where t2 occurs after t1 and the two events have different categorisations. As such, the selecting unit 1220 can be configured to select, in response to the respective categorised events of the event track, a first avatar configuration at time t1 and a second avatar configuration can be selected by the selecting unit at time t2. In other words, the selecting unit 1220 selects a configuration dependent upon the event track generated by the authoring unit 1210, and in some examples the configuration may be selected from a plurality of configurations defined by the avatar configuration model.

In embodiments of the disclosure the output generator 1230 can be configured to generate control data to configure an avatar in response to a selected configuration. The control data can be generated by the output generator 1240 in response to an avatar configuration selected by the selecting unit 1220 and the control data can be used to configure an avatar in a manner such that the avatar has a configuration corresponding to the configuration selected by the selecting unit. The control data may, for example, comprise animation scripts of a known kind corresponding to different avatar configurations for an avatar model. The control data may also provide parameter data such as speed/sequencing information to make an animation more responsive to an event—for example a fear reaction may be faster if an explosion is louder. In the case that a physical (robot) avatar is used, then such scripts and parameters may be passed to a robot controller API specified by the maker of the robot.

The control data may also comprise audio cues, such as identifying pre-recorded utterances of surprise, delight, fear etc., or inputs for text-to-speech synthesis to allow for more responsive utterances, such as commenting positively or negatively on a currently on-screen actor or character. Control data may also be provided in response to an event that is, effectively a non-event; hence if no controls have been sent to the avatar for a predefined period of time in response to the content, then a 'heartbeat' event may be triggered, causing avatar behaviour such as coughing, looking around, yawning, looking over at the user or the like in order to maintain an illusion of awareness and engagement.

In embodiments of the disclosure the output generator can be configured to generate the control data for the content in real-time. As noted previously, the authoring unit 1210 may generate the event track for the content in real-time meaning that an event track can be generated for content such as a television programme, or a movie or similar recorded content whilst the content is presented to the user. This means that the selecting unit 1220 can be configured to select an avatar configuration in response to respective categorised events of the event track in real-time, and the control data can be generated by the output generator in real-time so that the avatar may be configured in response to a selected configuration in real-time. Hence the user may view a television programme, or a movie, for example, and the configuration of the avatar can be driven in real-time in accordance with the generated control data.

Again, it will be appreciated that the control data may be generated off-line or in real time by the user's client device receiving content, or may be generated off-line or in real time by a broadcasting or streaming service, and included within the broadcast/stream for use by the user's client device.

Figure 13:
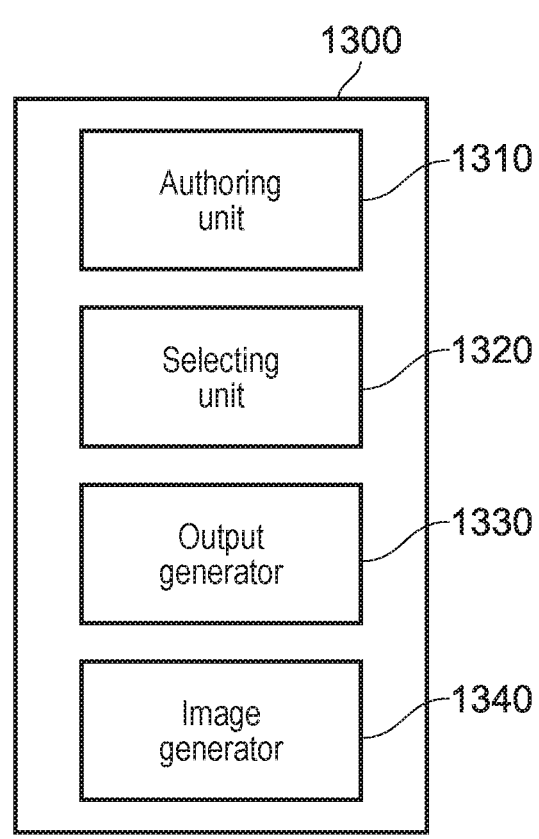
FIG. 13 schematically illustrates a functional block diagram of an apparatus for configuring an avatar responsive to a content comprising an image generator.

FIG. 13 illustrates a functional block diagram of an apparatus 1300 for configuring an avatar responsive to a content comprising at least one of a video and an audio signal, in which the apparatus 1300 comprises: an authoring unit 1310, a selecting unit 1320, an output generator 1330 and an image generator 1340. In embodiments of the disclosure the image generator 1340 can be configured to generate, based on the control data, images including a virtual avatar having a selected configuration, for display to a user by a head mountable display (HMD) 20.

The image generator 1340 may be provided as part of the HMD 20 or as part of the games console 300 or both, and can be configured to generate images in accordance with the control data generated by the output generator 1330. Hence the image generator 1340 can be controlled to generate images including the virtual avatar, in which the virtual avatar has a configuration according to the control data generated by the output generator 1330, based on the content. In addition to generating the images including the virtual avatar, the image generator 1340 may be configured to generate images representing a virtual environment. As such, the image generator 1350 may be configured to generate, based on the control data and the content, images representing the virtual environment including the virtual avatar having a selected configuration, for display to the user by the HMD 20. In this way the image generator 1350 can generate images representing the virtual environment and the content, for which the images include the virtual avatar having a configuration according to the control data.

Alternatively or in addition, a second image generator 1340 may be configured to generate the images representing the virtual environment for display to the user by the HMD 20, such that the images displayed to the user by the HMD may represent a virtual environment including the virtual avatar having a configuration corresponding to an avatar configuration selected by the selecting unit 1320, in accordance with images generated by the first image generator 1340 and the second image generator 1340.

Images can be generated for display to the user by the HMD 20 in a manner such that both the virtual environment and the virtual avatar configuration corresponding to the content as indicated by the control data can be simultaneously displayed to the user. The images include the virtual avatar having a configuration that is selected responsive to the event track associated with the content, where the event track comprises one or more events detected in the content and categorised by the authoring unit 1310. As such, the configuration of the virtual avatar can be selected responsive to the event track generated for the content, and the content can be presented to the user by the HMD 20 where the displayed images comprise a virtual avatar that appears to react to the events in the content as they occur. In this way, the virtual avatar can assume a plurality of respective configurations in response to the plurality of categorised events included in the event track and the virtual avatar configuration displayed to the user appears to react responsive to the content. The virtual avatar can thus be animated responsive to the respective categorised events of the event track, each categorised event typically associated with a respective time, so that the virtual avatar can be animated responsive to the event track. As such, the virtual avatar appears to the user to react to the events in the displayed content as they occur and in a manner that is appropriate to the properties of an event. Hence the virtual avatar may provide a sense of companionship for the user and the user's experience of the content may thus be enhanced.

By way of example, the virtual environment may resemble a movie theatre with the content displayed on a movie screen, and with the companion avatar may then sit next to the user's own notional seated viewpoint and provide reactions and optionally commentary to foster a sense of companionship.

Figure 14:
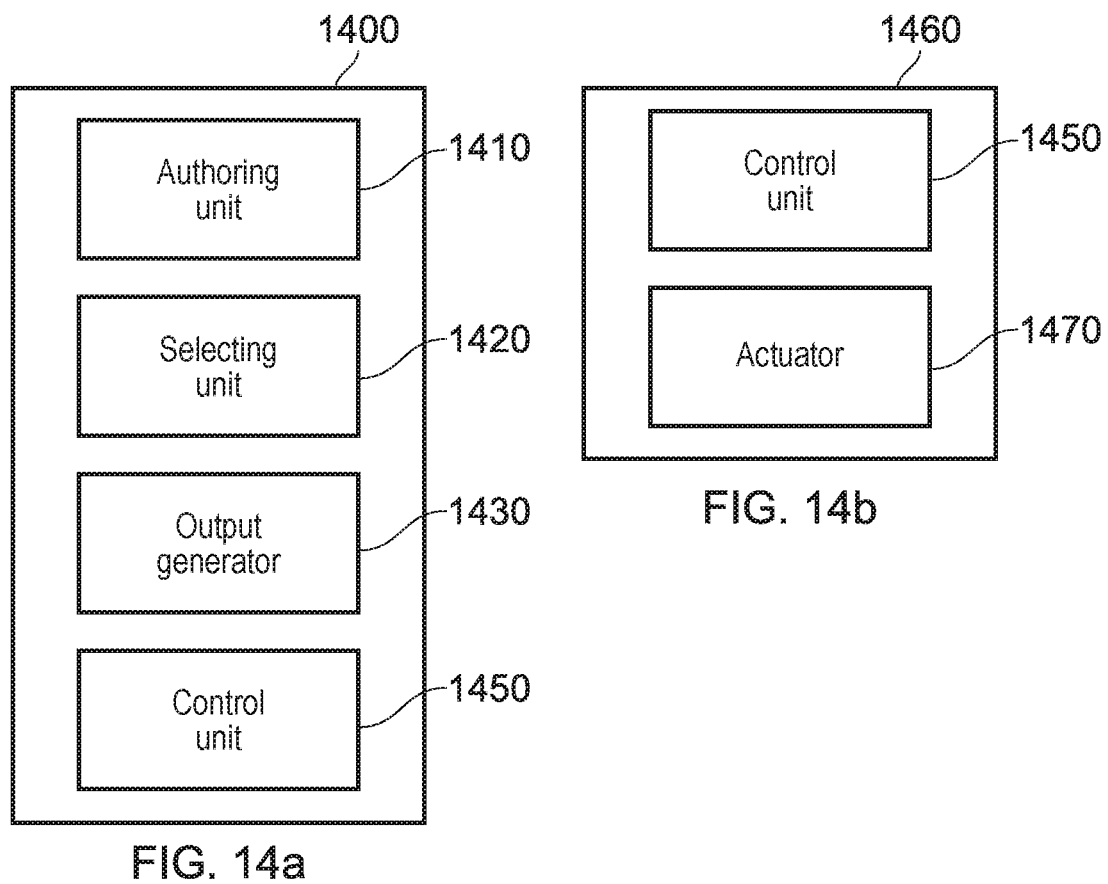
FIG. 14a schematically illustrates a functional block diagram of an apparatus for configuring an avatar responsive to a content comprising a robot control unit.
FIG. 14b schematically illustrates a functional block diagram of a robot apparatus comprising a robot control unit and an actuator.

FIG. 14*a* illustrates a functional block diagram of an apparatus 1400 for configuring an avatar responsive to a content comprising at least one of a video and an audio signal, in which the apparatus 1400 comprises: an authoring unit 1410, a selecting unit 1420, an output generator 1430 and a robot control unit 1450. In embodiments of the disclosure the robot control unit 1450 can be configured to control, based on the control data, one or more actuators of a robot to configure the robot to have a selected configuration. The robot control unit 1450 may be provided as part of the games console 300, as part of the HMD 20, and/or as part of the robot apparatus 1460 as illustrated in FIG. 14*b*. FIG. 14*b* illustrates a functional block diagram of a robot apparatus 1460 comprising the control unit 1450 and one or more actuators 1470. It will be appreciated that a physical robot companion may more likely be used when content is being viewed with a television, as the robot may then be seen more easily than when wearing an HMD. Consequently references to HMD may be understood to also encompass a TV as appropriate.

In accordance with FIGS. 14*a* and 14*b*, the control data generated by the output generator 1430 can be received by the robot control unit 1450 provided as part of the games console 300, the HMD 20 and/or the robot 1460 via a wired or wireless communication, and the robot control unit 1450 can be configured to control the one or more actuators 1470 of the robot 1460 via a wired or wireless communication. In this way, the one or more actuators 1470 of the robot 1460 can be controlled based on the control data generated by the output generator 1430 and the robot 1460 can be controlled to have a configuration that corresponds to a configuration selected by the selecting unit 1420 which is indicated by the generated control data. Consequently, the configuration of the robot 1460 can be controlled to have a configuration responsive to the respective categorised events of the event track, and the content associated with the event track can be provided to the user via a suitable display such as the display of the HMD 20 or a display 305 such as a television or other openly viewable display. In this way, the content can be presented to the user, and the robot 1460 can be controlled by the robot control unit 1450 such that the robot 1460 appears to react to the events in the content as they occur when viewed by the user.

The robot 1460 may assume a plurality of respective configurations in response to the plurality of categorised events included in the event track, in a similar manner to the virtual avatar described previously, such that the robot's configuration can be controlled with respect to time in accordance with the content so that it appears to the user that the robot reacts responsive to the events in the content. Hence the robot 1460 may provide a sense of companionship for the user and the user's experience of the content may thus be enhanced.

Figure 15:
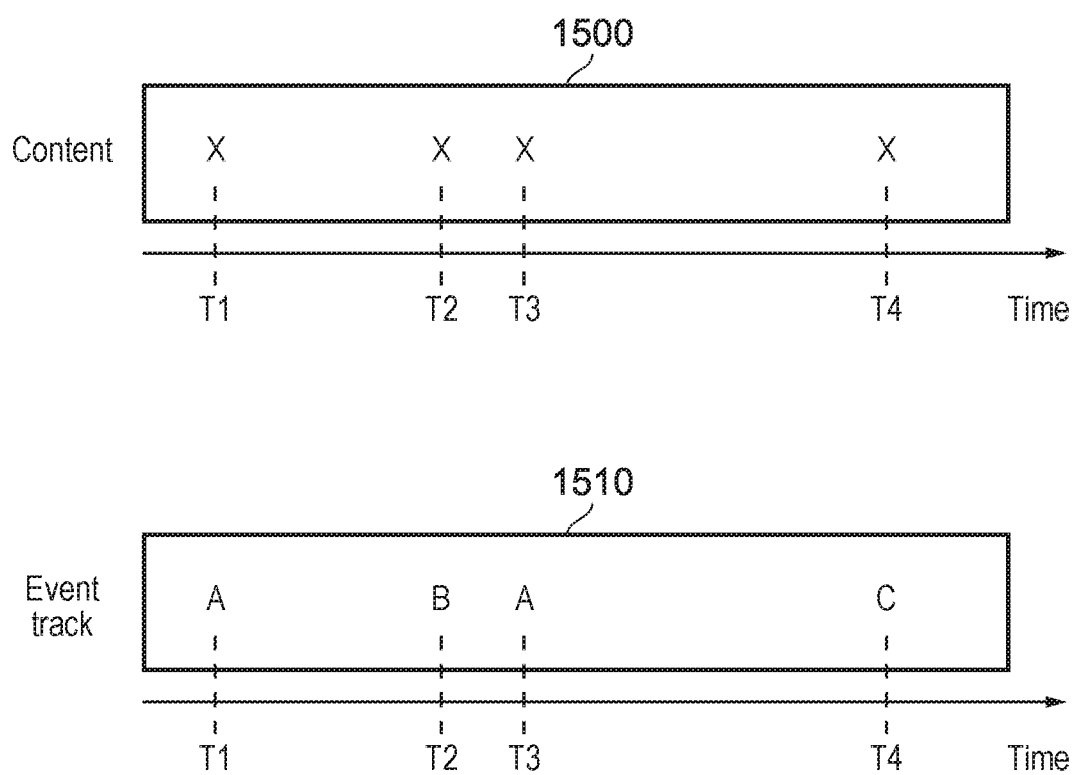
FIG. 15 schematically illustrates a content for which events are detected and categorised to generate an event track for the content.

FIG. 15 illustrates an example of a content 1500 comprising audio and video signals for which the authoring unit 1210, 1310, 1410 can be configured to detect one or more events "X" in the content based on the properties of at least one of the audio and video signals. The authoring unit 1210, 1310, 1410 can be configured to categorise one or more of the detected events "X" according to a categorisation including classes A, B and C, for example. An event track 1510 can be generated for the content 1500 by the authoring unit 1210, 1310, 1410, which comprises one or more of the categorised events A, B and C associated with a respective time. In the example shown, four events "X" are detected in the content at times T1, T2, T3 and T4. The events are categorised as either A, B or C, and it will be appreciated that a larger number of respective categories may be considered. In this example, all off the detected events "X" are categorised and the event track 1510 is generated to include all of the categorised events A, B and C, and the categorised events have a respective time T1, T2, T3, and T4 in the event track. The respective times T1, T2, T3, and T4 for the respective categorised events A, B and C in the event track 1510 are determined according to the time of the detected event with respect to the content 1500. In some examples, the authoring unit 1210, 1310, 1410 may detect one or more events "X" in the content and of the detected events, some of the events may be categorised and some events may not be categorised.

With reference to FIG. 15, the authoring unit 1210, 1310, 1410 may detect an event "X" for the content 1500 at a time T1. For example, the event may be detected by performing an analysis of the properties of at least one of the audio signal and the video signal and comparing one or more of the properties with one or more predetermined event criterion (indicators). As such, the event "X" may be detected at the time T1 based on an amplitude, intensity or frequency of the audio signal, and/or a chrominance or luminance property indicated by the video signal. In this way, events in the content 1500 such as explosions, rain, sunlight and gun fire may be detected by comparison of such properties of audio and/or video signals with respective predetermined event indicators.

Alternatively or in addition, the authoring unit 1210, 1310, 1410 can be configured to detect one or more events in the content based on an audio analysis that identifies one or more sounds corresponding to one or more predetermined event indicators. For example, a first event indicator may correspond to a sound of laughter and a second event indicator may correspond to a sound of a screaming voice. The respective event indicators can be compared with the audio signal to detect whether the audio signal comprises one or more sounds corresponding to one or more of the predetermined event indicators. As such, events in the content 1500 corresponding to laughter or screaming, for example, may be detected by the authoring unit 1210, 1310, 1410 based on one or more predetermined event indicators.

Alternatively or in addition, the authoring unit 1210, 1310, 1410 can be configured to detect one or more events in the content by using one or more predetermined event indicators to detect sound effects such as canned laughter, or drawing a sword, or to detect one or more spoken words. It will be appreciated that the authoring unit may thus operate in a similar manner to that described previously, for example optionally obtaining information from one or more of EPG data, subtitle data and supplementary description data to identify events.

Alternatively or in addition, the authoring unit 1210, 1310, 1410 can be configured to detect one or more events in the content based on an image analysis that identifies one or more image features in an image corresponding to one or more predetermined event indicators. For example, a first event indicator may correspond to an image of a spider and a second event indicator may correspond to an image of a gun. The respective event indicators may be compared with one or more images of the video signal to detect whether the video signal comprises one or more image features corresponding to one or more of the predetermined event indicators. As such, events in the content 1500 in which the images comprise a spider or a gun, for example, may be detected by the authoring unit 1210, 1310, 1410 based on one or more predetermined event indicators.

The authoring unit 1210, 1310, 1410 can be configured to categorise the detected events "X" according to at least one of the audio classification and the image classification, as mentioned previously. For example, the audio classification may comprise classes A, B and C, as shown in FIG. 15, where A may correspond to amusement, B may correspond to happiness, and C may correspond to fear. Similarly, the image classification may also comprise the classes A, B and C. As such, an event may be detected according to a first event indicator or a second event indicator and subsequently categorised by the authoring unit 1210, 1310, 1410 according to the audio classification or the image classification or both. The event may be detected based on a first event indicator, and based on the first event indicator (e.g. screaming voice or laughter) the authoring unit 1210, 1310, 1410 may categorise the detected event into one of the classes A, B or C. For example, if the event is detected at time T1 based on the first event indicator which corresponds to laughter then the authoring unit 1210, 1310, 1410 may categorise the detected event "X" into class A which corresponds to amusement.

For the one or more categorised events, the authoring unit 1210, 1310, 1410 can be configured to generate the event track 1510. The event track 1510 illustrated in FIG. 15 comprises the respective categorised events A, B, A and C, for which each categorised event has a respective time T1, T2, T3 and T4, which is derived according to the time of the event in the content. Consequently, the event track 1510 for the content 1500 comprises one or more categorised events arranged relative to each other in the event track 1510 with respective times, and the relative timings can be determined based on the times at which the detected events occur in the content with respect to each other.

As with the virtual avatar embodiment, the event track can be generated by the user's client device or by a broadcaster/streamer for inclusion in a transmission, and may be done offline or in real time. As noted previously, when done in real time (or embedded in a transmission), an explicit timestamp may not be needed.

In embodiments of the disclosure the apparatus 1200, 1300, 1400 comprises a modelling unit (not shown in FIGS. 12, 13 and 14) configured to adapt, in response to a user profile, an avatar configuration model defining a plurality of predetermined avatar configurations. For example, the avatar configuration model may initially define at least a first avatar configuration and a second avatar configuration, in which the first avatar configuration corresponds to an avatar wearing a coat holding an umbrella and the second avatar configuration corresponds to an avatar that claps and cheers. Other avatar configurations may be similarly considered such as a happy avatar, a scared avatar and an avatar that jumps up and down. For example, the selecting unit 1220, 1320, 1420 may select a configuration of the avatar to correspond to a respective categorised event of the event track by selecting a configuration in accordance with the model.

With reference to FIG. 15, the content 1500 may be presented to the user by the HMD 20 (or the display 305), and the apparatus 1200, 1300, 1400 can select a configuration of the avatar to correspond to a respective categorised event of the event track 1510. For example, the selecting unit 1220, 1320, 1420 may select a configuration defined by the avatar configuration model in response to the respective categorised events of the event track 1510 so that the selected configuration corresponds to a respective categorised event. An avatar configuration may be selected from the plurality of avatar configurations defined by the avatar configuration model so that, according to the respective categorised events A, B, A and C of the event track illustrated in FIG. 15, the selected avatar configuration corresponds to: a first avatar configuration of the avatar configuration model at time T1; a second avatar configuration of the avatar configuration model at time T2; the first avatar configuration of the avatar configuration model at time T3; and a third avatar configuration of the avatar configuration model at time T4. Hence the avatar can be configured, in response to the content, to have one or more configurations that are appropriately timed with respect to the audio and visual properties of the content when presented to the user.

The apparatus 1200, 1300, 1400 can select a configuration of the avatar to correspond to an avatar configuration defined by the avatar configuration model in response to the respective categorised events of the event track 1510. The modelling unit can be configured to generate the avatar configuration model so as to initially define a plurality of predetermined avatar configurations. Each of the plurality of predetermined avatar configurations of the model can be respectively mapped to a corresponding event categorisation. In this way, the avatar configuration model may initially define a first avatar configuration and a second avatar configuration, wherein the first avatar configuration is selected in response to a categorised event having a first classification (e.g. A in FIG. 15) and the second avatar configuration is selected in response to a categorised event having a second classification (e.g. B in FIG. 15).

In embodiments of the disclosure the apparatus 1200, 1300, 1400 comprises a user input unit (not shown in FIGS. 12, 13 and 14) configured to receive user input data and generate a user profile characterising behavioural patterns of the user, wherein the user profile is updated in response to the user input data received for the user. The user input unit can be configured to receive the user input data via a wired or wireless communication such as one using the Bluetooth® link or the Wi-Fi® wireless link. The user input data may be generated by one or more input devices which may be, for example, a Sony® Move® controller 330 or a Sony DualShock 4® handheld controller or a mobile communication device, which can communicate wirelessly with the apparatus 1200, 1300, 1400. A user profile can be generated for the user comprising information such as the user's age, gender, nationality, and certain likes and dislikes such as the user's favourite TV programmes according to the user input data. The user input unit can be configured to generate the user profile and store the user profile, so that the user profile can be updated in response to user input data received by the user input unit. For example, before, during or after viewing a content, the user may be presented with a plurality of questions at least some of which are related to the content. The user can respond to the questions by providing an input via the one or more input devices. As such, the user's profile can be updated, based on the user input data provided by the user, with information related to aspects of the content as well as general preferences and. In some examples, the user may respond to a question by either providing a binary input (e.g. "yes" or "no") or providing an input ranging from 0 to 10. As such, the user profile comprises information characterising the behaviour of the user and can be updated in response to the user input data, such that the user profile provides an indication of one or more behaviours expected for the user in response to one or more events.

In embodiments of the disclosure the user input data comprises at least one of data entered by the user using an input device in response to one or more questions associated with the content and image data associated with the user captured by a camera. As well as the data entered by the user using an input device, the user input unit can be configured to receive image data captured by a camera. Consequently, the user profile for the user can be updated in response to at least one of the data entered by the user in response to one or more questions and the image data associated with the user. For example, the image data associated with the user may be captured by the camera 122, 322 mounted on the HMD 20, and/or by a camera mounted with respect to the games console such that the camera faces the user in order to capture images of the user. Hence the user profile may be updated according to answers provided by the user in response to questions associated with the content, and may also be updated according to the user's reactions to certain events when viewing the content.

The image data provided by the camera 122, 322 mounted on the HMD 20 may be received by the user input unit indicating the user's motion and/or posture in response to events in the content being presented to the user. For example, the image data can be used to update the user's profile with information regarding the user's likes and dislikes, such as whether the user likes or dislikes spiders, based on the image data provided by the camera 122, 322 at the time corresponding to when the user viewed an image including the spider. Similarly, image data may be obtained from the camera facing the user in order to identify the user's behaviour in response to certain events as they occur. Alternatively or in addition, image data provided by the camera 122, 322 and/or motion data provided by the hardware motion detector 332 may be received by the user input unit. In this way, at least one of the image data and the motion data can be used to identify the user's behaviour in response to one or more events and the user's profile can be updated accordingly. For example, such data may be used to update the user's profile with information regarding the user likes or dislikes based on at least one of a motion and a posture of the user in response to observing an event.

In embodiments of the disclosure the avatar configuration model initially defines a plurality of predetermined avatar configurations and the modelling unit is configured to adapt, in response to the user profile, the avatar configuration model defining the plurality of predetermined avatar configurations. The initial avatar configuration model can be provided as part of the software of the apparatus 1200, 1300, 1400 and as such may be pre-installed for the apparatus. Alternatively or in addition, the apparatus 1200, 1300, 1400 may obtain data associated with the initial avatar configuration model from a server in data communication with the apparatus. The data associated with the initial avatar configuration model may then be used by the apparatus 1200, 1300, 1400 for defining the plurality of predetermined avatar configurations of the model that can be adapted in response to changes in the user profile. Alternatively or in addition, when obtaining EPG data or supplementary data associated with a content, the apparatus 1200, 1300, 1400 may obtain data associated with one or more new avatar configurations and generate one or more new avatar configurations based on the obtained data. For example, one or more new avatar configurations such as new poses, actions or postures for the avatar may be generated based on the obtained data, and the avatar configuration model can be populated with the one or more new avatar configurations. As such, the avatar configuration model can be adapted to include one or more new avatar configurations according to data associated with a content, which is obtained by the apparatus.

For the avatar configuration model, each predetermined avatar configuration can be initially mapped to a corresponding event categorisation, and the mapping of the respective avatar configurations to the respective event categorisations can be adapted responsive to the user profile. This means that the avatar configuration can be selected in response to a categorised event of the event track according to which avatar configuration is mapped to event categorisation corresponding to the event, so that the selecting unit 1220, 1320, 1420 may select a configuration of the avatar to correspond to a respective categorised event of the event track.

Figure 16:
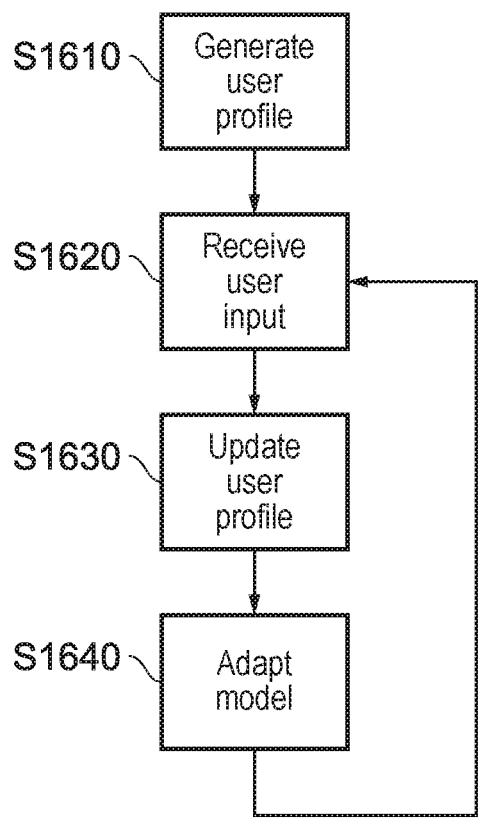
FIG. 16 is a schematic flowchart illustrating a method of adapting an avatar configuration model in response to a user profile.

In embodiments of the disclosure the selecting unit 1220, 1320, 1420 is configured to select a configuration of an avatar to correspond to a respective categorised event of the event track in accordance with the avatar configuration model. FIG. 16 illustrates a method of adapting the avatar configuration model in response to the user profile, in which the user profile is generated at a step S1610. At a step S1620 user input data for the user is received, the user input data comprising at least one of data entered by the user using the input device in response to one or more questions associated with the content and image data associated with the user captured by the camera. At a step S1630 the user profile is updated in response to the user input data received for the user. At a step S1640 the avatar configuration model defining a plurality of predetermined avatar configurations is adapted in response to the user's profile. The user profile can be updated in response to user input data received for the user and the avatar configuration model can be adapted accordingly in response to updates to the user profile.

Figure 17:
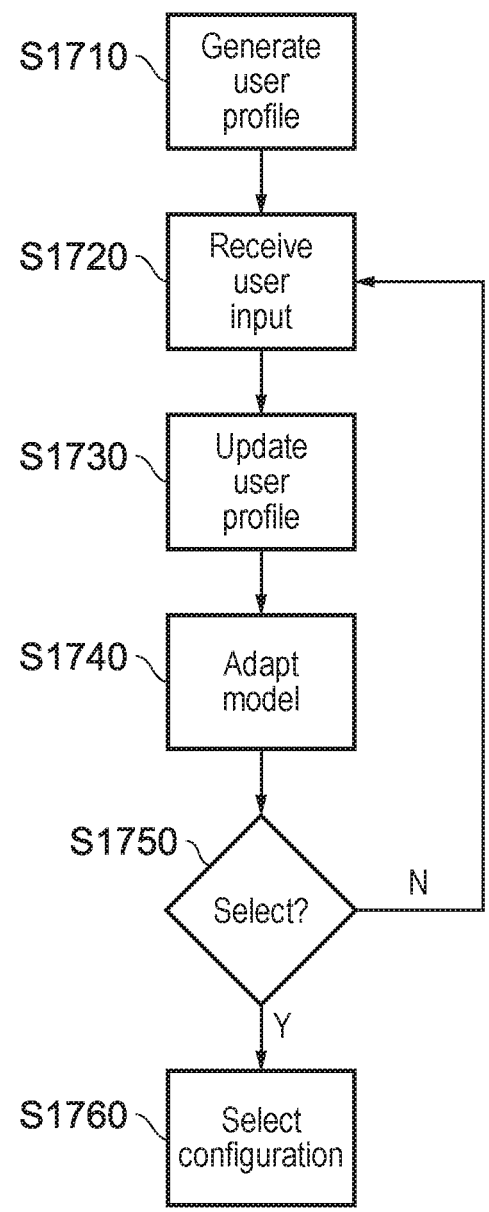
FIG. 17 is a schematic flowchart illustrating a method of adapting an avatar configuration model in response to a user profile and selecting a configuration of an avatar according to the adapted avatar configuration model.

FIG. 17 illustrates a method of adapting the avatar configuration model in response to the user profile and selecting a configuration of an avatar to correspond to an avatar configuration defined by the avatar configuration model. The user profile is generated at a step S1710, and at a step S1720 user input data for the user is received. At a step S1730 the user profile is updated in response to the user input data received for the user. At a step S1740 the avatar configuration model defining a plurality of predetermined avatar configurations is adapted in response to the user's profile. At a step 1750 the method either proceeds to step 1760 in order to select a configuration of an avatar to correspond to a respective categorised event of the event track in accordance with the avatar configuration model, or proceeds to the step 1720 and receives user input data which can be used to update the user profile (the step 1730) and adapt the avatar configuration model (the step 1740).

As noted previously, the avatar configuration model can be initially generated by the modelling unit so as to initially define a plurality of predetermined avatar configurations, comprising a first avatar configuration and a second avatar configuration. The respective avatar configurations can be initially defined such that that the first avatar configuration is selected in response to a categorised event of the event track having a first classification and the second avatar configuration is selected in response to a categorised event of the event track having a second classification.

The user profile comprises information characterising the behaviour of the user and can be updated in response to the user input data. Consequently, the user profile can be updated with information indicating one or more behaviours exhibited by the user in response to one or more events. In this way, the user profile can provide information indicating one or more behaviours expected for the user in response to one or more events. The information from the user profile can be used by the modelling unit to adapt the avatar configuration model defining the plurality of predetermined avatar configurations for the user, in response to changes in the user's profile. In this way, the avatar configuration model can be adapted according to the user's likes and dislikes by defining the respective avatar configurations to correspond to certain categorisations of events. In response to one or more changes in the user profile, the avatar configuration model for the user may be adapted by adapting the first avatar configuration such that the first avatar configuration is defined to correspond to a particular categorisation, so that the first avatar configuration will be selected in response to an event of the event track having the particular categorisation. For example, the avatar configuration model may initially define the first avatar configuration so that the first avatar configuration is selected in response to an event with a first categorisation. In response to the updated user profile, the avatar configuration model for the user may be adapted according to the user's user input data so that the first avatar configuration is selected in response to an event with a second categorisation, and for an event with a first categorisation a second avatar configuration may be selected.

In some examples, the user profile may indicate that the user generally responds to an event having a particular categorisation in the content in a dispassionate manner. For example, the user may provide no answer in response to a particular question associated with the event or may provide a response midway within the available range of responses, or the image data associated with the user that is captured by the camera may indicate that the user generally has an indifferent reaction in response to viewing the event. In this case, the avatar configuration model for the user may be adapted so that an avatar configuration that initially corresponds to the particular categorisation is adapted (redefined)

so that the avatar configuration model defines a plurality of avatar configurations for which none of the avatar configurations will be selected in response to an event with the particular categorisation.

Based on the user profile, the modelling unit can be configured to identify one or more patterns in the user's behaviour. For example, when the content is presented to the user the user input data may indicate that the user exhibits a particular behavioural response at a given time when viewing the content (e.g. the user may cower). Based on the user profile, the modelling unit may identify that the user exhibits the particular behavioural response on numerous occasions, either when viewing the same content or when viewing different content. The modelling unit can therefore identify the respective times at which the particular behavioural response is exhibited by the user and identify if the behavioural response corresponds to a particular event categorisation in the event track. As such, the modelling unit can be configured to identify the pattern in the user's behaviour and identify if the behavioural response corresponds to a particular event categorisation. In this way the avatar configuration model can be adapted in accordance with the behavioural patterns of the user.

For example, the user profile may indicate that the user exhibits a particular behavioural response at a plurality of respective times when viewing the content, where the respective times each correspond to an event having the same categorisation. In this case, the avatar configuration model can be adapted so that an avatar configuration of the plurality of avatar configurations is defined to correspond to the categorisation, so that the avatar configuration will be selected in response to the categorisation.

As such, the modelling unit can adapt the avatar configuration model for the user in response to the user profile by defining one or more respective avatar configurations in accordance with the information characterising the behavioural patterns of the user. The avatar configuration model can be adapted to suit the user's behavioural traits, so that an avatar configuration can be selected for a particular event of the event track. This means that the configuration of the virtual avatar displayed by the HMD 20 can be configured to respond to the content displayed by the HMD 20 in a manner suitable for the content using the avatar configuration model as defined for the user.

In embodiments of the disclosure the selecting unit 1220, 1320, 1420 is configured to select the configuration of the avatar to correspond to an avatar configuration defined by the avatar configuration model which most closely matches a behaviour expected for the user for a categorised event of the event track. The avatar configuration model can be adapted to define one or more respective avatar configurations in accordance with the user's profile information. Each avatar configuration of the model can be mapped to an event categorisation and the mapping can be adapted for the user's profile. As such, the model can be adapted to define at least a first avatar configuration that is mapped to a particular event categorisation so that the first avatar configuration can be selected by the selecting unit 1230, 1330, 1430 in response to an event with the particular event categorisation. The avatar configuration model can be adapted to map the first avatar configuration to a particular event categorisation, such that the behaviour expected for the user for the particular event categorisation is similar to the first avatar configuration. This means that for certain events where the user profile indicates that the user typically exhibits certain behaviours, the avatar may exhibit similar behaviours so that the user and the avatar's emotional experiences may somewhat correspond.

The avatar configuration model defines a plurality of avatar configurations and, based on the user profile information, an avatar configuration from amongst the plurality of avatar configurations can be mapped to a particular event categorisation, where the avatar configuration is chosen based on a degree of similarity between the avatar configuration and the user's expected behaviour for the categorisation. The avatar configuration model can be adapted for the user profile, so that the selecting unit 1220, 1320, 1420 can select the configuration of the avatar to correspond to an avatar configuration defined by the model, wherein the avatar configuration is defined such that it is mapped to a categorisation for which the user's expected behaviour closely matches the emotions conveyed by the avatar. In this way, the avatar configuration can be selected responsive to the content in a manner such that the avatar may enhance the user's experience by providing a sense of companionship where both the avatar and the user enjoy and dislike certain aspects of the content.

For example, the plurality of avatar configurations defined by the model may comprise three respective avatar configurations, such as happiness (e.g. smiling avatar configuration), amusement (e.g. laughing avatar configuration) and fear (e.g. cowering avatar configuration/hiding behind object), respectively. The event track may comprise events having a plurality respective categorisations, such as happiness (A), amusement (B) and fear (C), for example. In this case, if the user profile indicates that the user will be expected to cower for an event categorised as fear (C), then the avatar configuration model can be adapted to map the fearful avatar configuration (e.g. cowering avatar configuration/hiding behind object) to categorisation for fear (C) so that the selecting unit 1220, 1320, 1420 will select a configuration for the avatar in response to a categorised event of the event track for which the emotions conveyed by the avatar configuration will closely match those expected of the user.

In embodiments of the disclosure when the behaviour expected for the user for a categorised event of the event track most closely matches a first avatar configuration defined by the avatar configuration model, optionally the selecting unit 1220, 1320, 1420 is configured to select the configuration of the avatar to correspond a second avatar configuration. In this way the avatar configuration selected by the selecting unit 1220, 1320, 1420 can be selected in response to a categorised event of the event track in a manner such that the avatar has a configuration so as to convey an emotion that is different to the emotional experience of the user for the categorised event. This means that the avatar may exhibit protective behaviours or may provide comfort to the user for certain events where the user profile indicates that the user typically exhibits behaviours associated with fear.

It will be appreciated therefore that a database, look-up table or similar of first and second configurations/responses may be retained. It will also be appreciated that not all responses may have a second configuration (for example, when the user is expected to be happy then the avatar joins in with the same first configuration, whereas if the user is sad then the avatar may exhibit a second, consoling configuration). It will also be appreciated that the first and second configurations may be implemented at the same time, or in immediate succession, so that the avatar both empathises and supports the user. In embodiments of the disclosure the avatar configuration model is adapted for the user in response to the user profile by identifying the behavioural patterns of the user, and generating one or more new avatar configurations according to one or more behavioural patterns. The modelling unit can be configured to identify one or more patterns in the user's behaviour and identify if a particular behavioural response corresponds to a particular event categorisation.

A behavioural pattern may be identified from the user profile information based on a plurality of respective behavioural responses having similar properties. For example, a behavioural pattern may comprise numerous respective instances of a particular behavioural response performed by the user, such as head nodding or the user jumping up and down. For example, the modelling unit may identify a particular behavioural response (e.g. cowering) for the user at a plurality of respective times. The categorised events of the event track that correspond to the particular behavioural response can be identified by comparing the times for the respective categorised events of the event track with the respective times at which the user exhibited the particular behavioural response. In some circumstances, there may be no categorised events in the event track corresponding to the times at which the user exhibited the behavioural response. In this case, the modelling unit can identify whether there exist one or more detected events for the content that were not categorised, and establish whether any of the detected events without a categorisation have a time corresponding to the time at which the user profile information indicates the user exhibited the particular behavioural response. When there exist one or more detected events without a categorisation which have respective times corresponding to the respective times at which the particular behavioural response occurred, the modelling unit can generate a new categorisation class and categorise the detected events according to a new categorisation class. As such, the modelling unit can adapt the avatar configuration model so as to map one of the existing avatar configurations to the new categorisation class. Alternatively, the modelling unit can generate a new avatar configuration and adapt the avatar configuration model to map the new avatar configuration to the new categorisation class. The new avatar configuration can be generated by the modelling unit based on the information from the user profile associated with the pattern in the user's behaviour used to identify the new categorisation. In this way, the adapted avatar configuration model can define one or more new avatar configurations according to one or more behavioural patterns of the user.

Alternatively or in addition, in some circumstances the particular behavioural response indicated by the user profile may not coincide with any of the detected events. When there is no correspondence between the respective instances of a particular behavioural response for a behavioural pattern and the detected events, this may indicate that there is a feature of the content which is of interest to the user that has not been detected (either audio or video or both). In this case, the respective times at which the user exhibited the particular behavioural response can be compared with at least one of the audio signal and the video signal of the content to. For example, a first portion of the content may be analysed for the time corresponding to a first instance of the particular behavioural response and a second portion of the content may be analysed for the time corresponding to a second instance of the particular behavioural response. In this way, the first portion may be compared with the second portion. Similarly, other portions of the content may be analysed for other respective instances of the particular behavioural response for the behavioural pattern in question. As such, the first portion of the content may be compared with a second portion and a third portion and so on, and characteristics of the content that are common to the respective portions may be indicative of an event.

Hence the apparatus 1200, 1300, 1400 can identify respective portions of the content that may comprise an undetected event based on the user's pattern of behaviour. The characteristics common to the respective portions may be stored and used by the authoring unit 1210, 1310, 1410 for future event detection such that new events may be detected in the content based on the user's profile information indicating one or more behavioural patterns for the user. The modelling unit can generate a new categorisation class for these events and categorise these detected events according to a new categorisation class. The modelling unit may adapt the avatar configuration model so as to map one of the existing avatar configurations to the new categorisation class. Alternatively, the modelling unit may generate a new avatar configuration and adapt the avatar configuration model to map the new avatar configuration to the new categorisation class. The new avatar configuration can be generated by the modelling unit based on the information from the user profile associated with the pattern in the user's behaviour used to identify the new categorisation. In this way, the adapted avatar configuration model can define one or more new avatar configurations according to one or more behavioural patterns of the user.

It will be appreciated that when implementing the techniques described herein, one or more steps may be amenable to machine learning, using suitable known techniques. Examples include the recognition and classification of audio or video cues for the event track, the selection of keywords from other data sources, and the selection of a particular avatar configuration and/or parameter values that adapt the configuration, responsive to the content cues. Other examples include modelling of the user's behaviour, and selecting when to use a first or second configuration, for example based upon an analysis of a user's reaction to the avatar or robot.

In embodiments of the disclosure a method of configuring an avatar responsive to a content comprising at least one of a video and an audio signal is provided. FIG. 18 is a flow diagram illustrating a method in accordance with an embodiment of the present invention comprising:

a first step S1810 of obtaining a content comprising at least one of a video and an audio signal;

a second step S1820 of detecting one or more events in the content;

a third step S1830 of categorising one or more of the detected events;

a fourth step S1840 of generating an event track for the content, the event track comprising one or more of the categorised events associated with a respective time;

a fifth step S1850 of selecting a configuration of an avatar to correspond to a respective categorised event of the event track; and a sixth step S1860 of generating control data to configure an avatar in response to a selected configuration.

FIG. 19 is a flow diagram illustrating a method in accordance with an embodiment of the present invention comprising:

a first step S1910 of obtaining a content comprising at least one of a video and an audio signal;

a second step S1920 of detecting one or more events in the content;

a third step S1930 of categorising one or more of the detected events;

a fourth step S1940 of generating an event track for the content, the event track comprising one or more of the categorised events associated with a respective time;

a fifth step S1950 of selecting a configuration of an avatar to correspond to a respective categorised event of the event track;

a sixth step S1960 of generating control data to configure an avatar in response to a selected configuration; and a seventh step S1970 of generating, based on the control data, images including a virtual representation of the avatar having a selected configuration, for display to a user by a head mountable display.

FIG. 20 is a flow diagram illustrating a method in accordance with an embodiment of the present invention comprising:

a first step S2010 of obtaining a content comprising at least one of a video and an audio signal;

a second step S2020 of detecting one or more events in the content;

a third step S2030 of categorising one or more of the detected events;

a fourth step S2040 of generating an event track for the content, the event track comprising one or more of the categorised events associated with a respective time;

a fifth step S2050 of selecting a configuration of an avatar to correspond to a respective categorised event of the event track;

a sixth step S2060 of generating control data to configure an avatar in response to a selected configuration; and a seventh step S2070 of controlling, based on the control data, one or more actuators of a robot representation of the avatar to configure the robot to have a selected configuration.

It will be apparent to a person skilled in the art that variations in the above method corresponding to operation of the various embodiments of the apparatus as described and claimed herein are considered within the scope of the present invention. It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

The invention claimed is:

1. An apparatus for configuring an avatar, comprising:
an authoring unit configured to:
obtain a content comprising at least one of a video signal containing video image data, and an audio signal containing audio data, where the content is media content being presented to the user, or that is to be presented to the user in the future;
detect, in the content, one or more events based on properties of, and analysis taken directly from, the at least one of the video image data and the audio data of the content;
categorize one or more of the detected events; and
generate and store an event track for the content, the event track comprising one or more of the categorized events each associated with a respective time within the content;
a user input unit configured to receive user input data produced by the user and generate a user profile characterising behavioural patterns of the user, wherein the user profile is updated in response to the user input data received for the user;
a modelling unit configured to adapt, in response to the user profile, an avatar configuration model defining a plurality of predetermined avatar configurations, wherein each of the plurality of predetermined avatar configurations is respectively mapped to a corresponding one of a plurality of event categorizations, and the modelling unit is configured to adapt the mapping in response to the user profile;
a selecting unit configured to select one of the predetermined avatar configurations in response to a respective one of the categorized events of the event track; and
an output generator configured to generate control data to configure the avatar for the user in response to the selected one of the predetermined avatar configurations.

2. An apparatus according to claim 1, further comprising: an image generator configured to generate, based on the control data, images including a virtual representation of the avatar having a selected configuration, for display to a user by a head mountable display.

3. An apparatus according to claim 1, further comprising: a robot control unit configured to control, based on the control data, one or more actuators of a robot representation of the avatar to configure the robot to have a selected configuration.

4. An apparatus according to claim 1, wherein the authoring unit is configured to categorize a detected event according to one or more of the list comprising:
i. an audio classification;
ii. an image classification; and
iii. supplementary descriptive data associated with the content, and
apply an event marker to the event track with a timestamp derived according to the detected event.

5. An apparatus according to claim 1, wherein the output generator is configured to generate the control data for the content in real time.

6. An apparatus according to claim 1, wherein the user input data comprises at least one of data entered by the user using an input device in response to one or more questions associated with the content and image data associated with the user captured by a camera.

7. An apparatus according to claim 1, wherein the avatar configuration model is adapted for the user in response to the user profile by identifying the behavioural patterns of the user, and generating one or more new avatar configurations according to one or more behavioural patterns.

8. An apparatus according to claim 1, wherein when the behaviour expected for the user for a categorized event of the event track most closely matches a first avatar configuration defined by the avatar configuration model, the selecting unit is configured to select the configuration of the avatar to correspond to a second avatar configuration.

9. A method of configuring an avatar, comprising:
obtaining a content comprising at least one of a video signal containing video image data, and an audio signal containing audio data, where the content is media content being presented to the user, or that is to be presented to the user in the future;

detecting one or more events in the content based on properties of, and analysis taken directly from, the at least one of the video image data and the audio data of the content;

categorizing one or more of the detected events;

generating and storing an event track for the content, the event track comprising one or more of the categorized events each associated with a respective time within the content;

receiving user input data produced by the user and generating a user profile characterising behavioural patterns of the user, wherein the user profile is updated in response to the user input data received for the user;

adapting, in response to the user profile, an avatar configuration model defining a plurality of predetermined avatar configurations, wherein each of the plurality of predetermined avatar configurations is respectively mapped to a corresponding one of a plurality of event categorizations, and the step of adapting comprises adapting the mapping in response to the user profile;

selecting one of the predetermined avatar configurations in response to a respective one of the categorized events of the event track; and generating control data to configure the avatar for the user in response to the selected one of the predetermined avatar configurations.

10. A method according to claim 9, further comprising the step of: transmitting or streaming the content to a receiver in association with one or more from a list comprising:

i. event track data; and ii. control data.

11. A method according to claim 9, further comprising: generating, based on the control data, images including a virtual representation of the avatar having a selected configuration, for display to a user by a head mountable display.

12. A method according to claim 9, further comprising: controlling, based on the control data, one or more actuators of a robot representation of the avatar to configure the robot to have a selected configuration.

13. A non-transitory, computer-readable storage medium containing computer software which, when executed by a computer, causes the computer to perform a method of configuring an avatar, by carrying out actions, comprising:

obtaining a content comprising at least one of a video signal containing video image data, and an audio signal containing audio data, where the content is media content being presented to the user, or that is to be presented to the user in the future;

detecting one or more events in the content based on properties of, and analysis taken directly from, the at least one of the video image data and the audio data of the content;

categorizing one or more of the detected events;

generating and storing an event track for the content, the event track comprising one or more of the categorized events each associated with a respective time within the content;

receiving user input data produced by the user and generating a user profile characterising behavioural patterns of the user, wherein the user profile is updated in response to the user input data received for the user;

adapting, in response to the user profile, an avatar configuration model defining a plurality of predetermined avatar configurations, wherein each of the plurality of predetermined avatar configurations is respectively mapped to a corresponding one of a plurality of event categorizations, and the step of adapting comprises adapting the mapping in response to the user profile;

selecting one of the predetermined avatar configurations in response to a respective one of the categorized events of the event track; and generating control data to configure the avatar for the user in response to the selected one of the predetermined avatar configurations.

\* \* \* \* \*